US008075080B2

(12) United States Patent
Albertalli et al.

(10) Patent No.: US 8,075,080 B2
(45) Date of Patent: Dec. 13, 2011

(54) CAMERA-BASED AUTOMATIC NOZZLE AND SUBSTRATE ALIGNMENT SYSTEM

(75) Inventors: David Albertalli, Santa Clara, CA (US); Robert G. Boehm, Jr., Livermore, CA (US); Ralph D. Fox, Livermore, CA (US); Perry West, Los Gatos, CA (US)

(73) Assignee: Ulvac, Inc., Kanagawa (JP)

( * ) Notice: Subject to any disclaimer, the term of this patent is extended or adjusted under 35 U.S.C. 154(b) by 955 days.

(21) Appl. No.: 11/912,192

(22) PCT Filed: Apr. 25, 2006

(86) PCT No.: PCT/US2006/015486

§ 371 (c)(1),
(2), (4) Date: Oct. 22, 2007

(87) PCT Pub. No.: WO2006/116318

PCT Pub. Date: Nov. 2, 2006

(65) Prior Publication Data

US 2010/0295896 A1 Nov. 25, 2010

Related U.S. Application Data

(60) Provisional application No. 60/674,590, filed on Apr. 25, 2005, provisional application No. 60/674,588, filed on Apr. 25, 2005, provisional application No. 60/674,591, filed on Apr. 25, 2005, provisional application No. 60/674,592, filed on Apr. 25, 2005, provisional application No. 60/674,589, filed on Apr. 25, 2005, provisional application No. 60/674,585, filed on Apr. 25, 2005, provisional application No. 60/674,584, filed on Apr. 25, 2005.

(51) Int. Cl.
*B41J 29/393* (2006.01)
*G01B 11/00* (2006.01)
*B41J 2/15* (2006.01)

(52) U.S. Cl. ............................ 347/19; 347/40; 356/400

(58) Field of Classification Search ..................... 347/19
See application file for complete search history.

(56) References Cited

U.S. PATENT DOCUMENTS 5,847,722 A * 12/1998 Hackleman .................... 347/19
(Continued)

FOREIGN PATENT DOCUMENTS

JP 2003165080 A * 6/2003

OTHER PUBLICATIONS

English translation of Japanese patent document JP 2003-165080A to Ikeda et al. "Method and Device for Teaching Positional Off-Set of Component Recognition Camera." Machine generated via http://www.ipdl.inpit.go.jp/homepg_e.ipdl on Dec. 29, 2010; 6 pgs.*

*Primary Examiner* — Shelby Fidler
(74) *Attorney, Agent, or Firm* — Harness, Dickey & Pierce, PLC

(57) ABSTRACT

According to the present disclosure, a printer apparatus may include a chuck configured to support a substrate thereon, a rail spaced apart from the chuck, a printhead carriage frame coupled to the rail and containing a printhead carriage housing at least one printhead therein, a first camera assembly configured to capture image data of the printhead and provide the image data to a computer, and a computer receiving the image data from the first camera assembly and configured to determine a deviation between a desired position of the printhead and an actual position of the printhead.

13 Claims, 37 Drawing Sheets

U.S. PATENT DOCUMENTS 7,556,334 B2 * 7/2009 White et al. .................... 347/19
2003/0189604 A1 * 10/2003 Bae et al. .......................... 347/2
2003/0206207 A1 * 11/2003 Stoessel et al. ................. 347/19
2004/0085388 A1 5/2004 Su et al.
2005/0062967 A1 * 3/2005 Kobayashi .................... 356/400
2005/0109959 A1 * 5/2005 Wasserman et al. ..... 250/559.19
2006/0039735 A1 * 2/2006 Oh et al. ....................... 400/320
2008/0170089 A1 * 7/2008 Albertalli et al. ................. 347/8
2008/0186353 A1 * 8/2008 Parks et al. ..................... 347/37
2010/0295896 A1 * 11/2010 Albertalli et al. ............... 347/37

* cited by examiner 322
360
334
336
322
360
360
322
360
312
338
346

356
330
354
320
318
344
314
322
360
340
342
360
322
322
360

CAMERA-BASED AUTOMATIC NOZZLE AND SUBSTRATE ALIGNMENT SYSTEM

CROSS-REFERENCE TO RELATED APPLICATIONS

This application is a National Stage of International Application No. PCT/US2006/015486, filed Apr. 25, 2006, and claims the benefit of U.S. Provisional Application Nos. 60/674,584, 60/674,585, 60/674,588, 60/674,589, 60/674,590, 60/674,591, and 60/674,592, all filed on Apr. 25, 2005. The disclosures of the above applications are incorporated herein by reference.

FIELD

The present disclosure relates to a piezoelectric microdeposition (PMD) apparatus and more particularly, to a printhead alignment assembly for a PMD apparatus.

BACKGROUND

The statements in this section merely provide background information related to the present disclosure and may not constitute prior art.

In industrial PMD applications, drop placement accuracy is important. There are a variety of causes for inaccuracies in drop placement. These causes may include misalignment between printheads in an array, as well as misalignment of a substrate to be printed upon. Manual adjustment of printheads and/or substrates may be costly, time consuming, and may still result in errors. As such, there exists a need for efficiently accounting for, and correcting, possible sources of error in drop placement.

SUMMARY

According to the present disclosure, a printer apparatus may include a chuck configured to support a substrate thereon, a rail spaced apart from the chuck, a printhead carriage frame coupled to the rail and containing a printhead carriage housing at least one printhead therein, a first camera assembly configured to capture image data of the printhead and provide the image data to a computer, and a computer receiving the image data from the first camera assembly and configured to determine a deviation between a desired position of the printhead and an actual position of the printhead.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
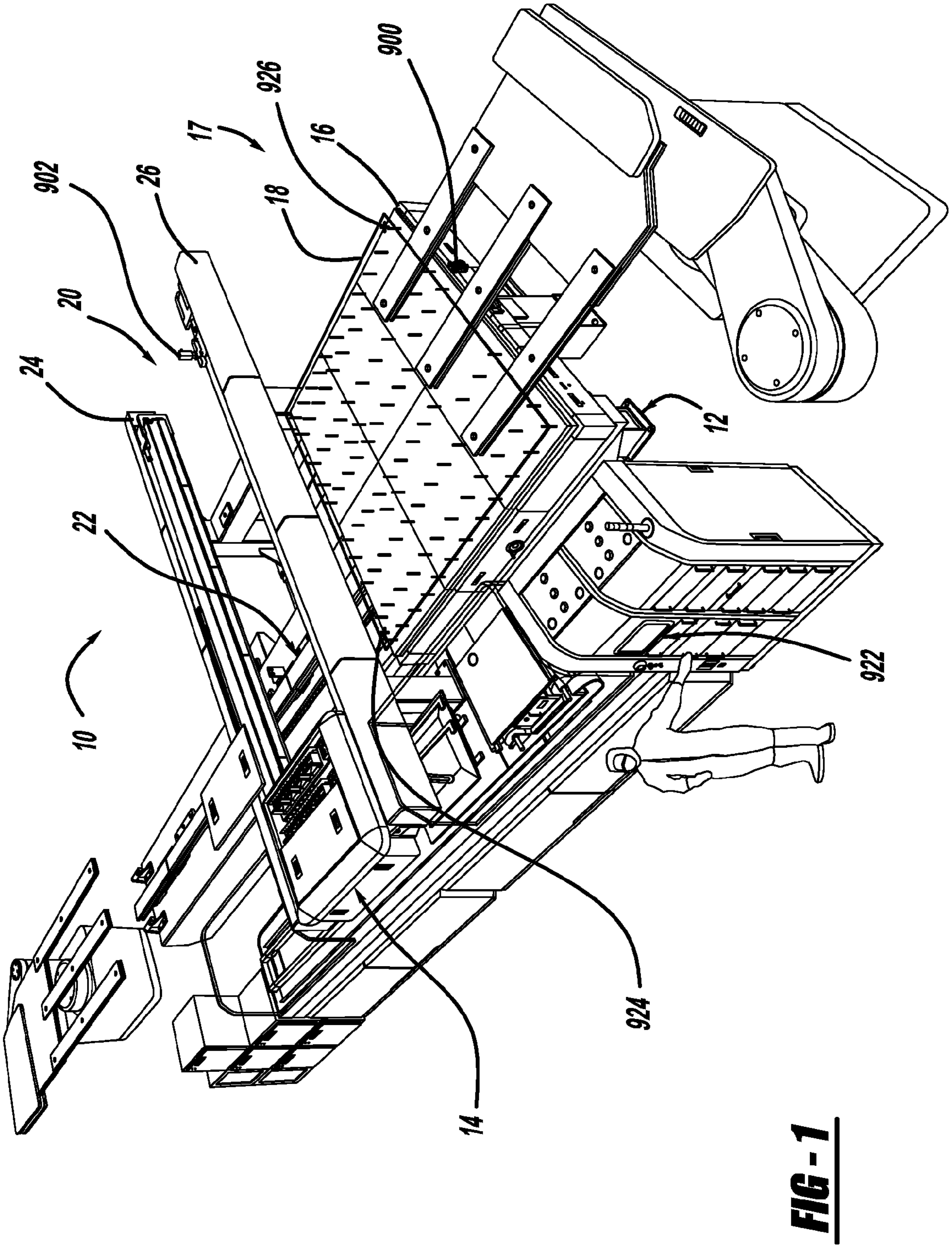
FIG. 1 is a perspective view of a piezoelectric microdeposition (PMD) apparatus according to the present disclosure.

The following description is merely exemplary in nature and is not intended to limit the present disclosure, application, or uses.

The terms "fluid manufacturing material" and "fluid material," as defined herein, are broadly construed to include any material that can assume a low viscosity form and that is suitable for being deposited for example, from a PMD head onto a substrate for forming a microstructure. Fluid manufacturing materials may include, but are not limited to, light-emitting polymers (LEPs), which can be used to form polymer light-emitting diode display devices (PLEDs and PolyLEDs). Fluid manufacturing materials may also include plastics, metals, waxes, solders, solder pastes, biomedical products, acids, photoresists, solvents, adhesives, and epoxies. The term "fluid manufacturing material" is interchangeably referred to herein as "fluid material."

The term "deposition," as defined herein, generally refers to the process of depositing individual droplets of fluid materials on substrates. The terms "let," "discharge," "pattern," and "deposit" are used interchangeably herein with specific reference to the deposition of the fluid material from a PMD head, for example. The terms "droplet" and "drop" are also used interchangeably.

The term "substrate," as defined herein, is broadly construed to include any material having a surface that is suitable for receiving a fluid material during a manufacturing process such as PMD. Substrates include, but are not limited to, glass plate, pipettes, silicon wafers, ceramic tiles, rigid and flexible plastic, and metal sheets and rolls. In certain embodiments, a deposited fluid material itself may form a substrate, in as much as the fluid material also includes surfaces suitable for receiving a fluid material during a manufacturing process, such as, for example, when forming three-dimensional microstructures.

The term "microstructures," as defined herein, generally refers to structures formed with a high degree of precision, and that are sized to fit on a substrate. In as much as the sizes of different substrates may vary, the term "microstructures" should not be construed to be limited to any particular size and can be used interchangeably with the term "structure." Microstructures may include a single droplet of a fluid material, any combination of droplets, or any structure formed by depositing the droplet(s) on a substrate, such as a two-dimensional layer, a three-dimensional architecture, and any other desired structure.

The PMD systems referenced herein perform processes by depositing fluid materials onto substrates according to user-defined computer-executable instructions. The term "computer-executable instructions," which is also referred to herein as "program modules" or "modules," generally includes routines, programs, objects, components, data structures, or the like that implement particular abstract data types or perform particular tasks such as, but not limited to, executing computer numerical controls for implementing PMD processes. Program modules may be stored on any computer-readable media, including, but not limited to RAM, ROM, EEPROM, CD-ROM or other optical disk storage, magnetic disk storage or other magnetic storage devices, or any other medium capable of storing instructions or data structures and capable of being accessed by a general purpose or special purpose computer.

As seen in FIG. 1, a piezoelectric microdeposition (PMD) apparatus 10 may include a frame 12, a printhead carriage frame 14, a vacuum chuck 16, and a vision system 17. Frame 12 may support a substrate 18 for printing thereon. Frame 12 may include an X-stage 20 and a Y-stage 22 mounted thereto. X-stage 20 may include first and second rails 24, 26 generally parallel to one another and extending across a width of frame 12, generally defining a print axis. Y-stage 22 may generally extend along the length of frame 12 and may be generally perpendicular to X-stage 20. Y-stage 22 may generally define a substrate axis. Printhead carriage frame 14 may be located between first and second rails 24, 26 and slidably coupled thereto for displacement along the print axis, generally providing for printing on substrate 18.

Figure 2:
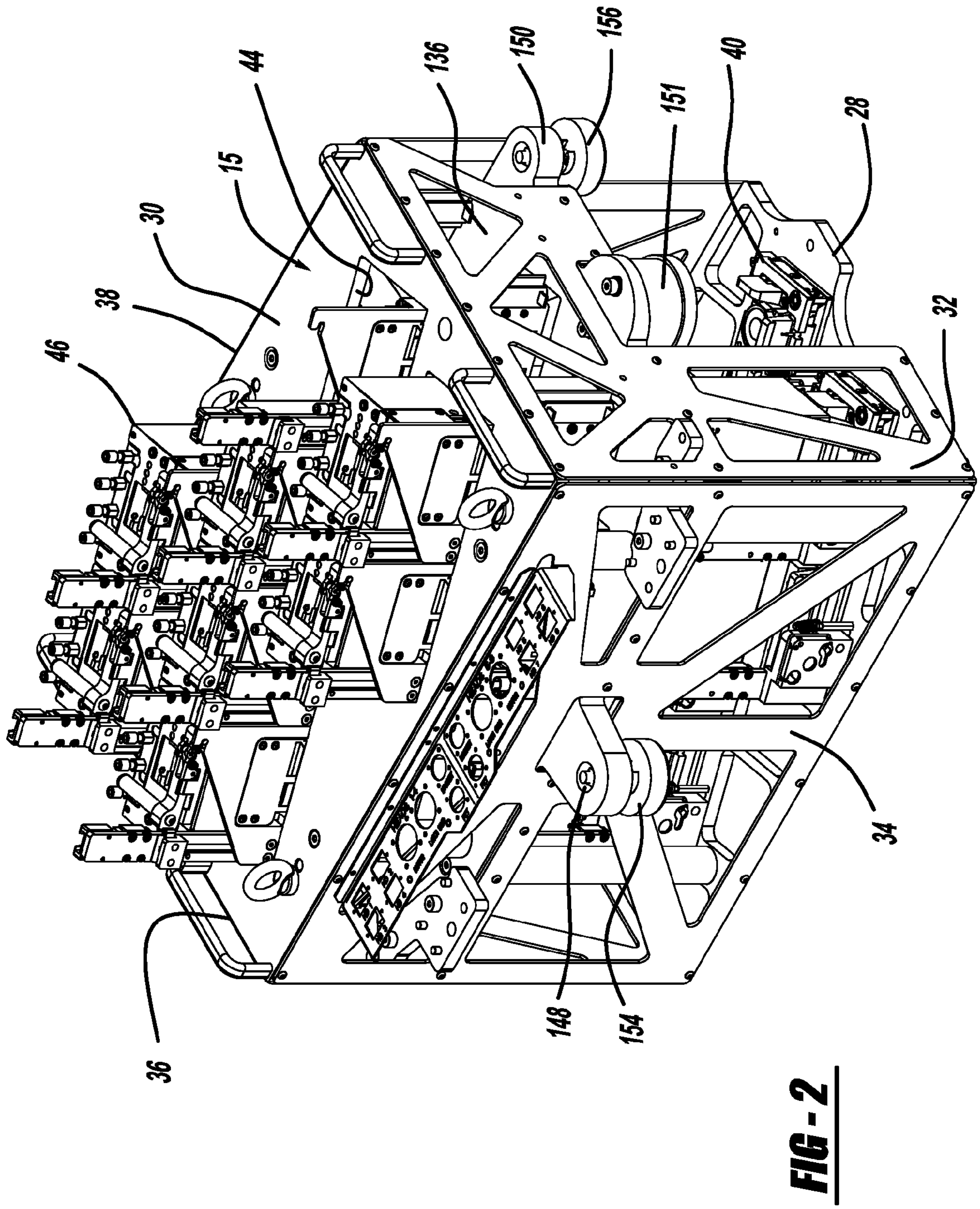
FIG. 2 is a perspective view of a printhead carriage assembly according to the present disclosure.
Figure 3:
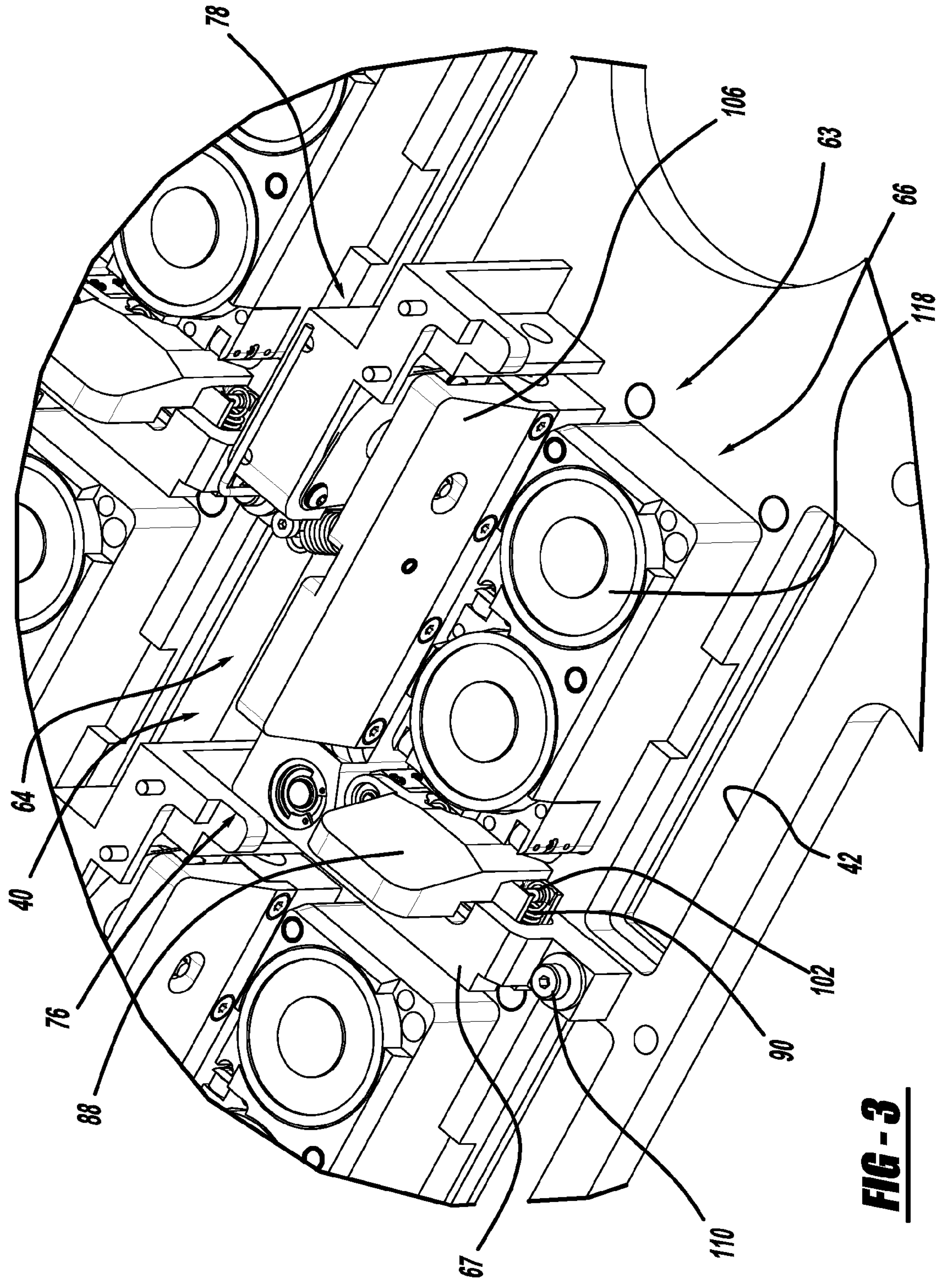
FIG. 3 is a fragmentary perspective view of the printhead carriage assembly of FIG. 2 including a printhead alignment assembly.

With additional reference to FIG. 2, printhead carriage frame 14 may include a printhead carriage 15 having a base plate 28, an upper plate 30, and sidewalls 32, 34, 36, 38. A dynamic printhead alignment assembly 40 may be coupled to base plate 28. As seen in FIG. 3, a clearance slot 42 may be located in base plate 28 adjacent printhead alignment assembly 40. An opening 44 may be located in upper plate 30 generally above printhead alignment assembly 40. A printhead assembly 46 (shown in greater detail in FIG. 4) may pass through opening 44 and may be coupled to printhead alignment assembly 40. While the above description references a single printhead assembly 46 and printhead alignment assembly 40, it is understood, and shown in FIG. 2, that printhead carriage 15 may include multiple printhead assemblies 46 and printhead alignment assemblies 40, forming a printhead array.

Figure 5:
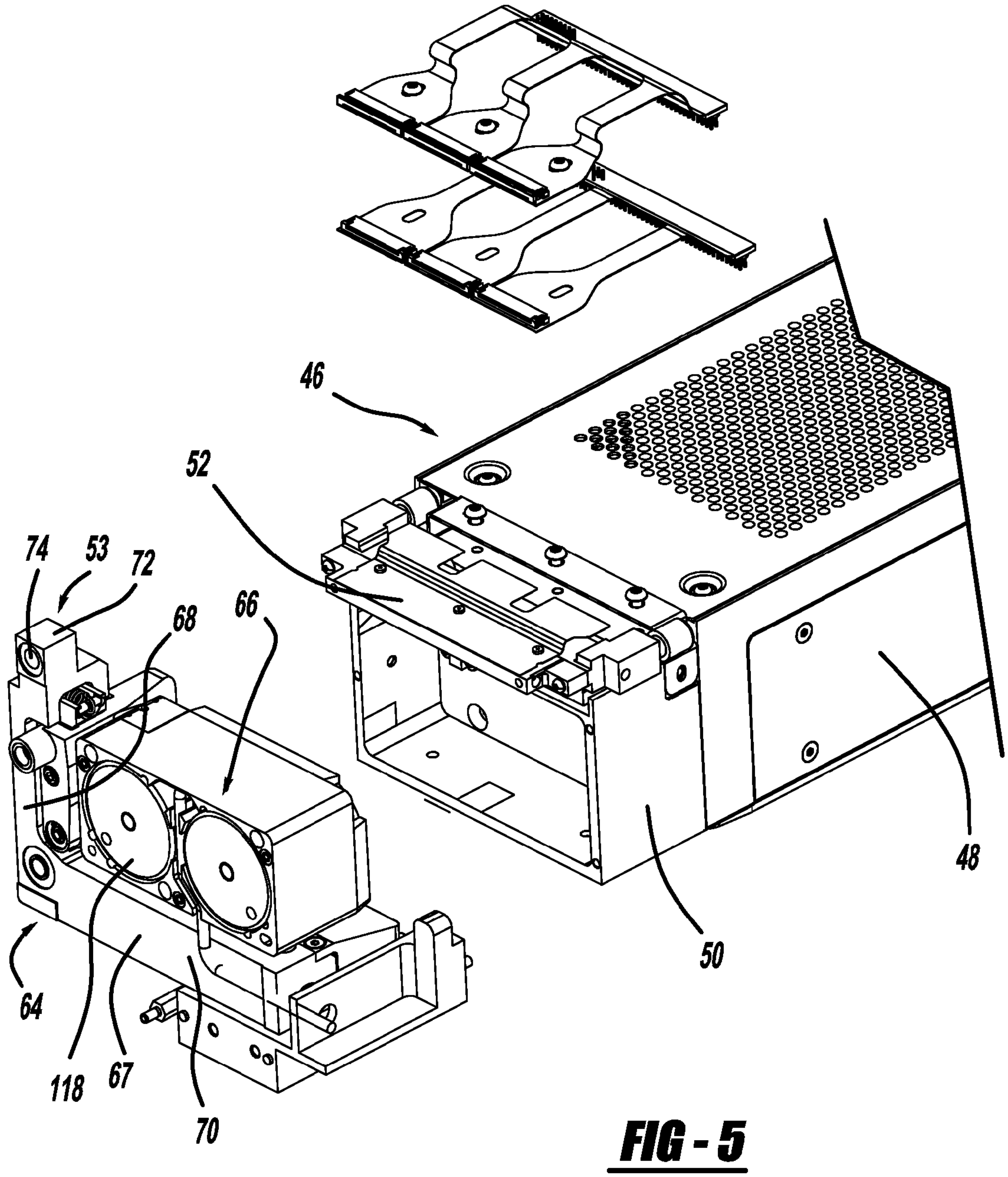
FIG. 5 is an exploded view of the actuation assembly of FIG. 3 and the printhead assembly of FIG. 4.
Figure 11:
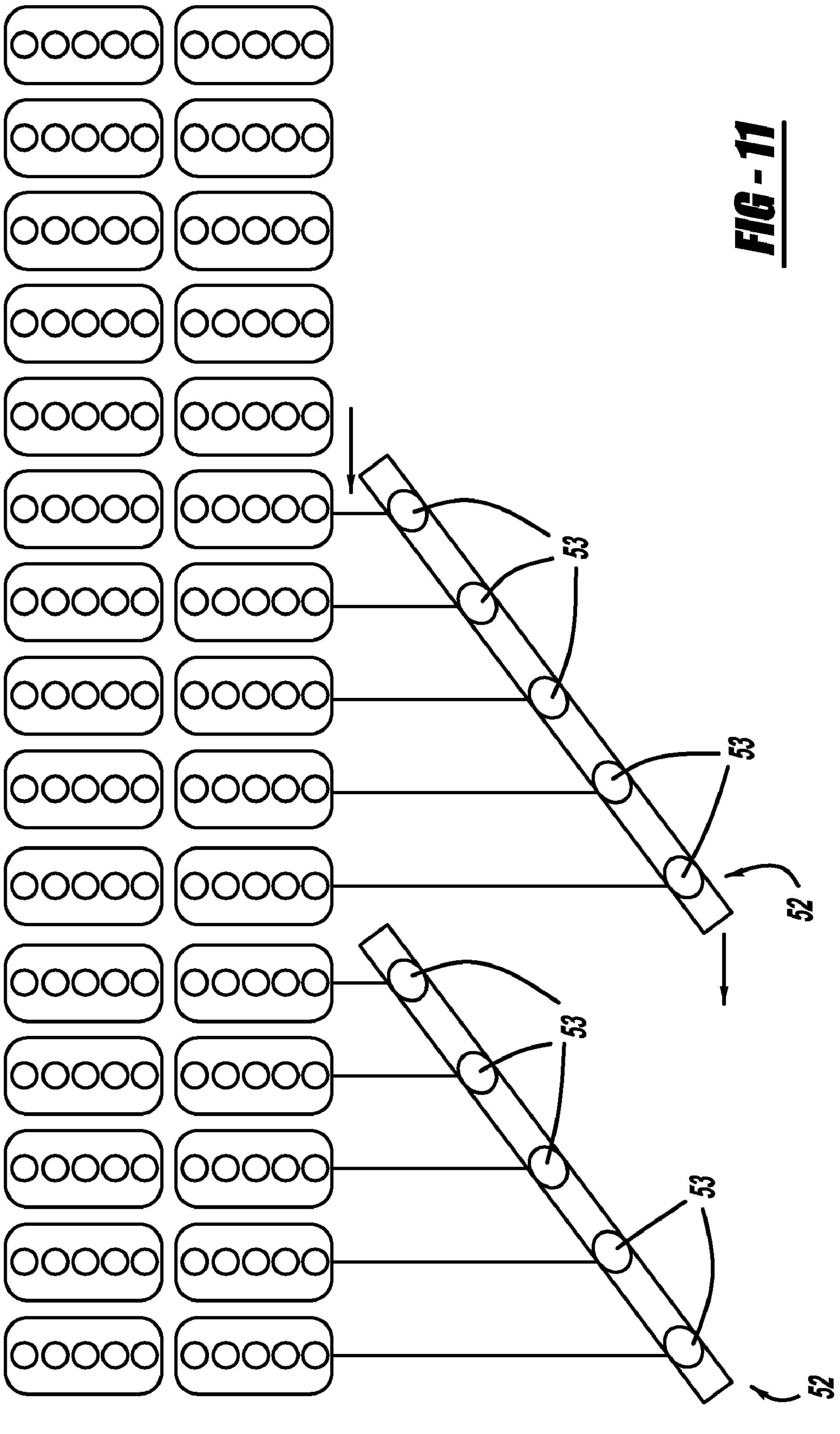
FIG. 11 is a schematic view of a printhead alignment.
Figure 12:
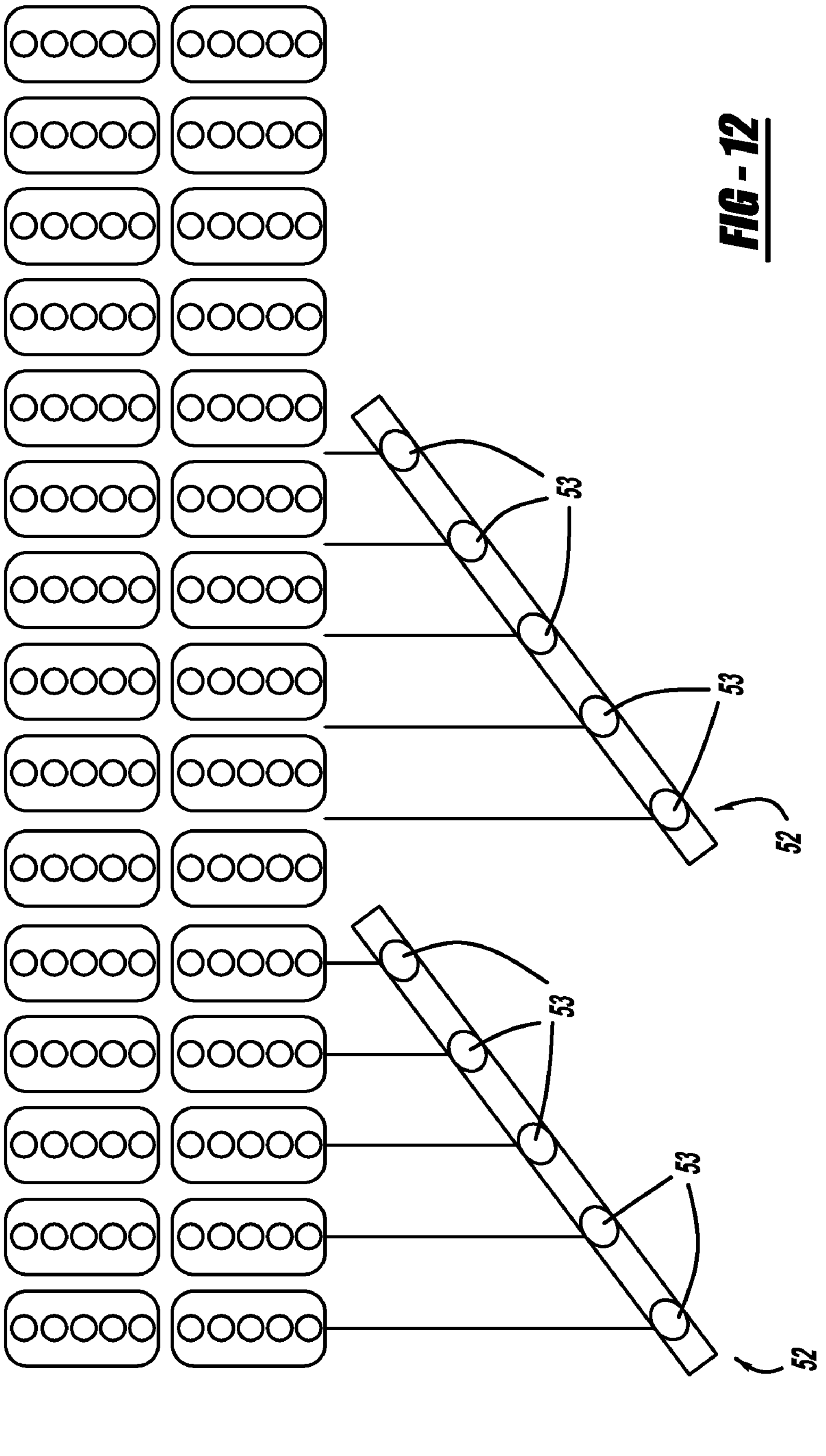
FIG. 12 is a schematic view of a printhead phase misalignment.
Figure 13:
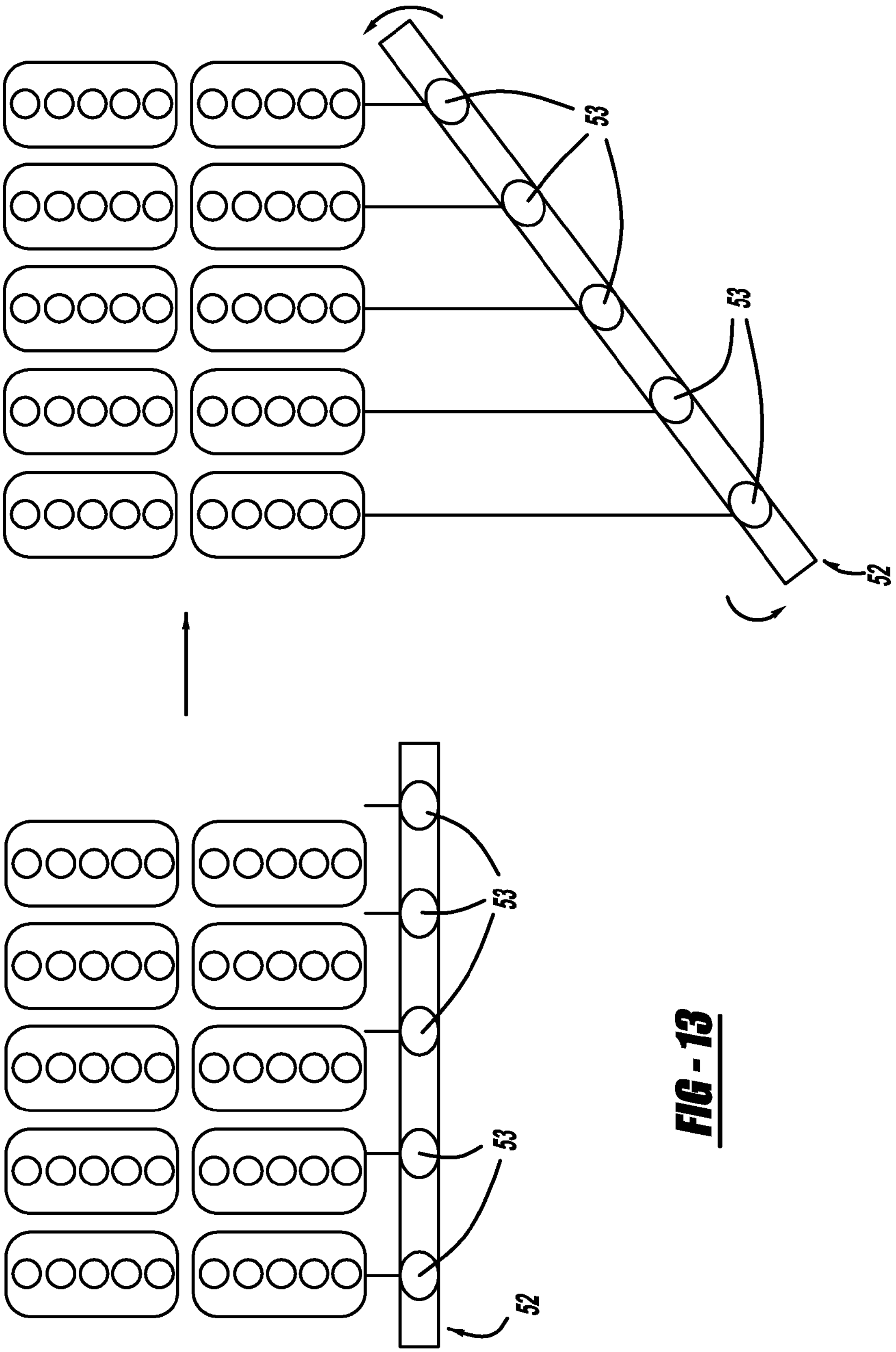
FIG. 13 is a schematic view of a printhead pitch misalignment and a printhead pitch alignment.
Figure 14:
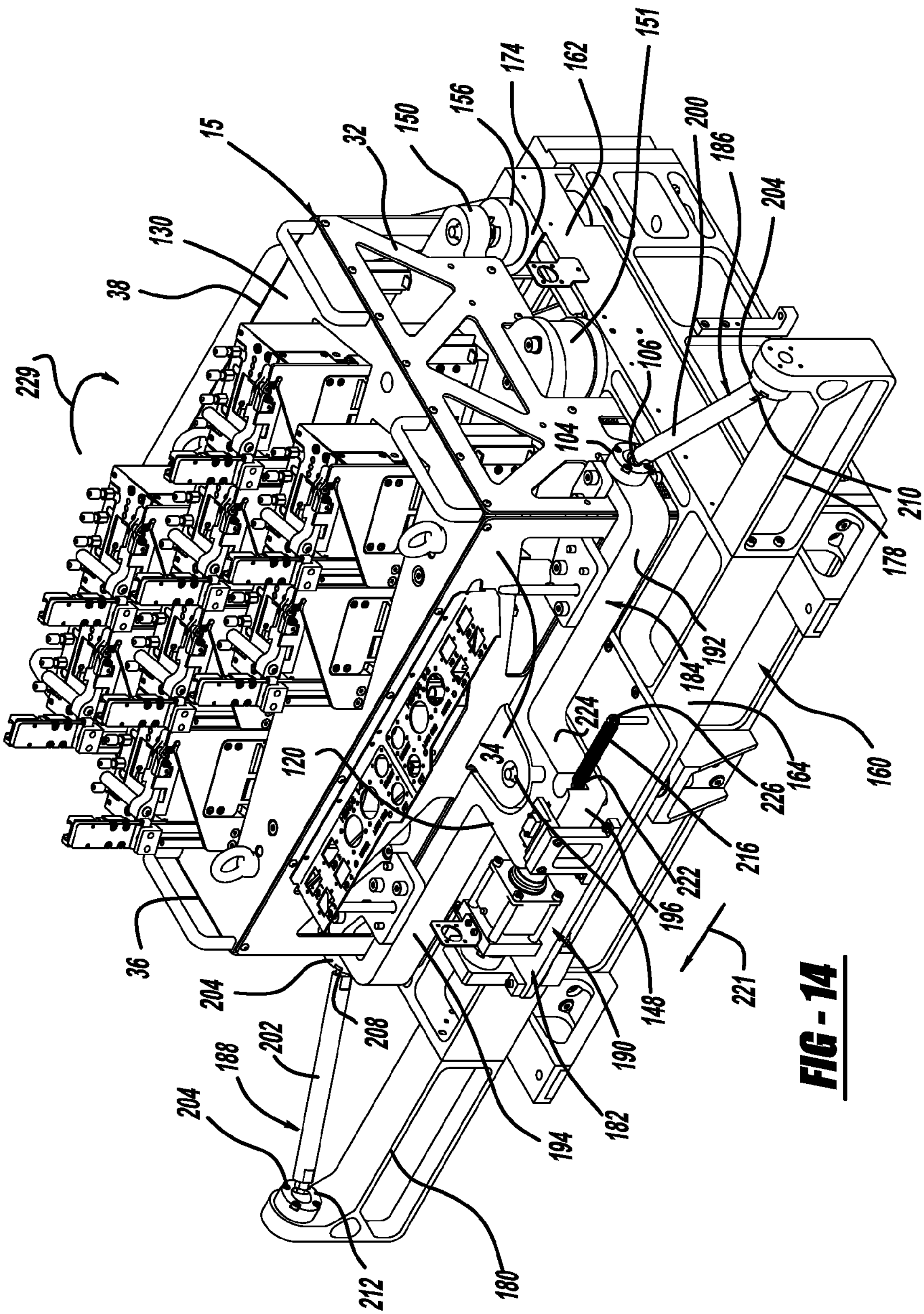
FIG. 14 is a perspective view of a printhead carriage frame according to the present disclosure.

With additional reference to FIG. 5, printhead assembly 46 may include a body 48 having a datum block 50 movably coupled thereto. Printhead 52 may be mated to datum block 50 using a precision bonding procedure and may include a series of nozzles 53 generally arranged in a row (shown schematically in FIGS. 11-13).

Figure 6:
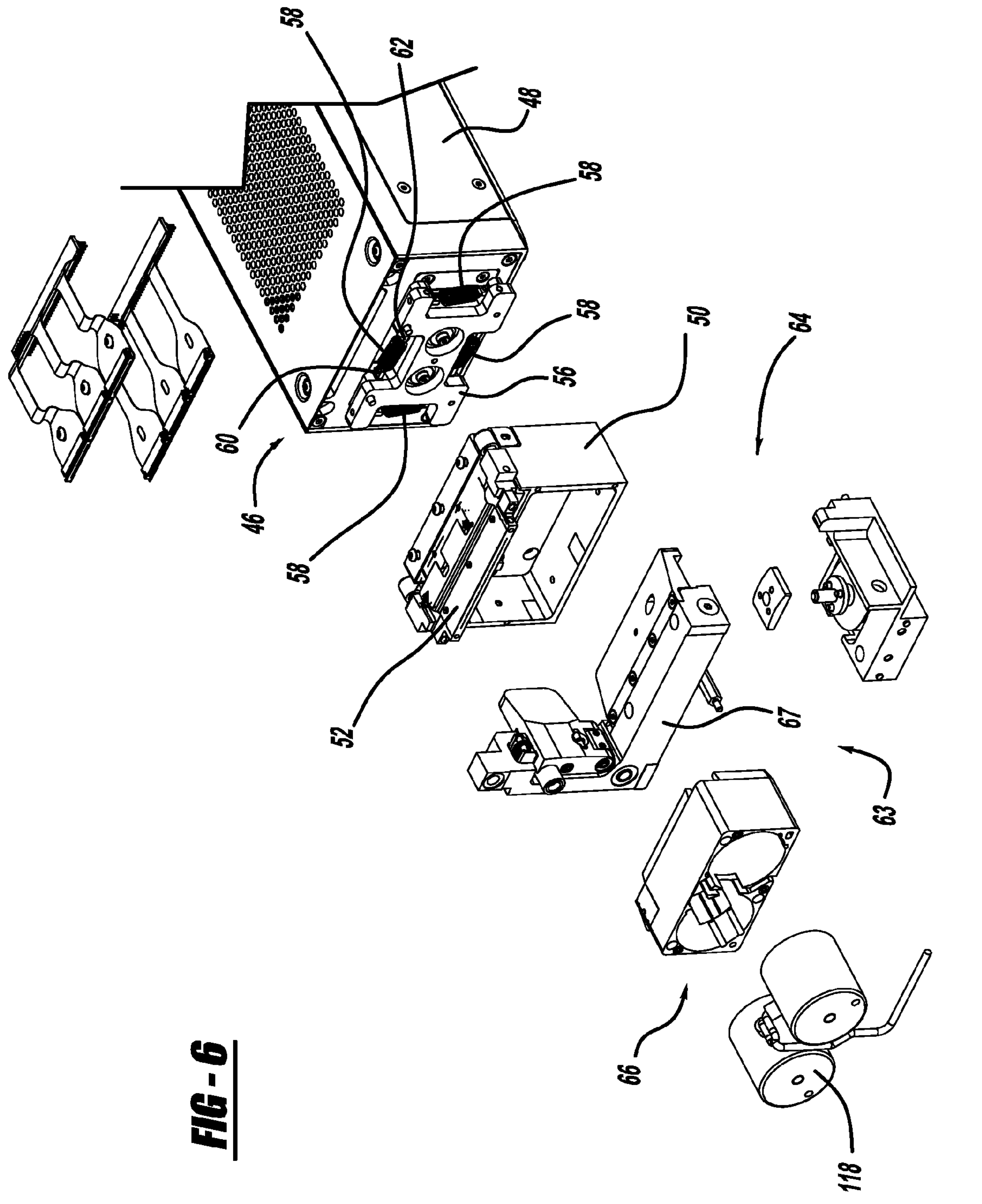
FIG. 6 is an additional, more fully exploded, view of the actuation assembly and printhead assembly of FIG. 5.
Figure 7:
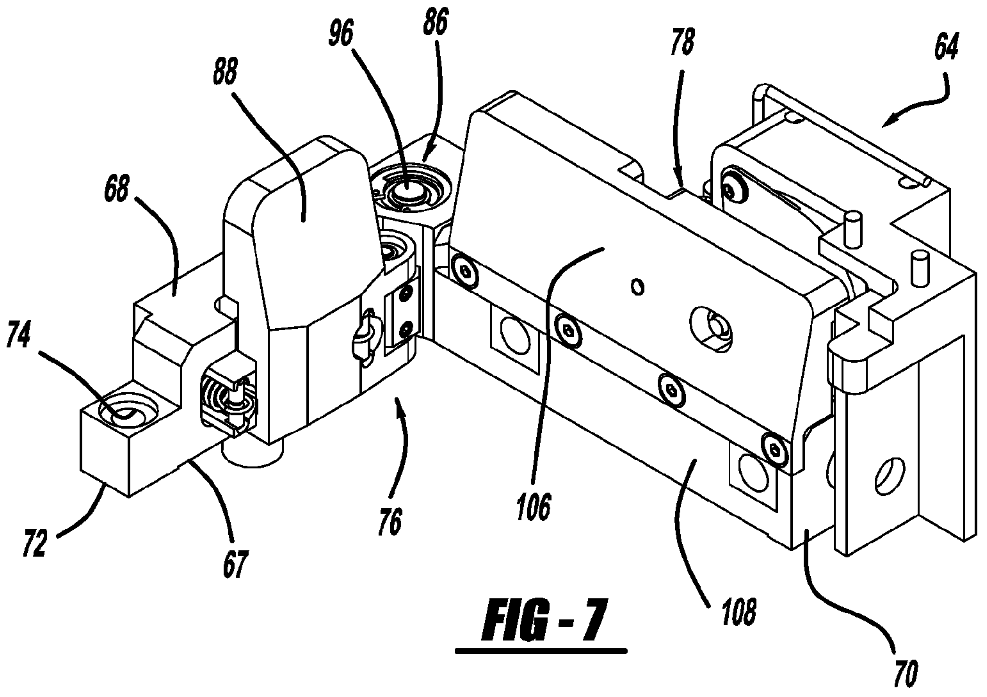
FIG. 7 is a perspective view of an actuation assembly shown in FIG. 3.
Figure 8:
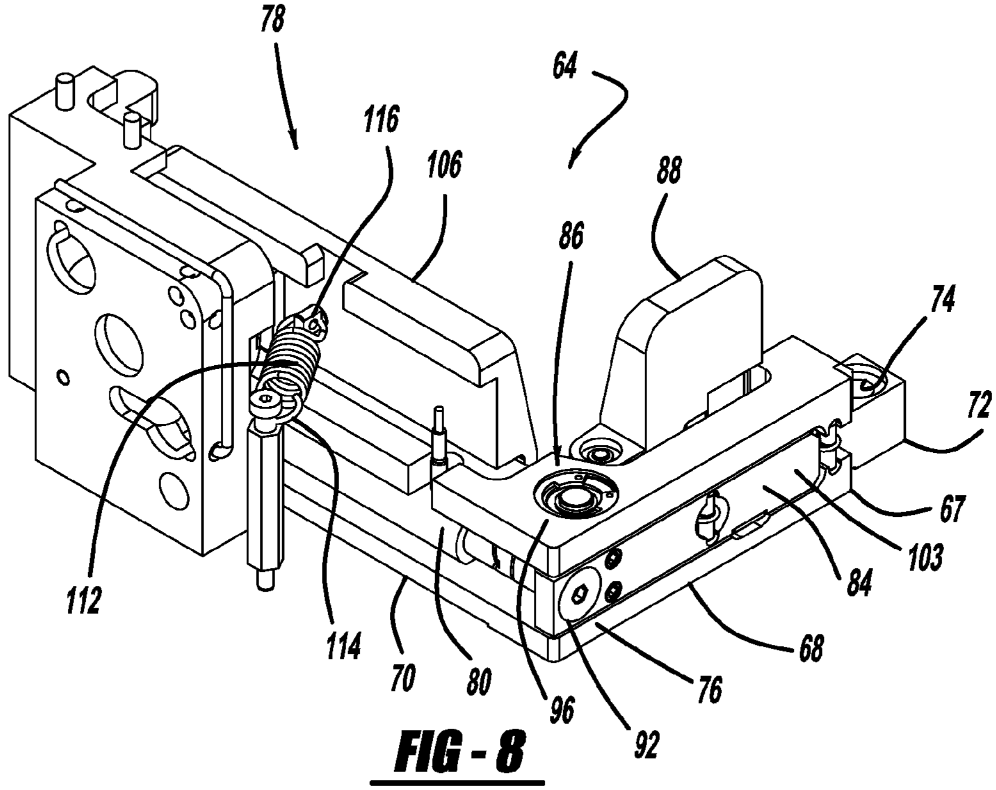
FIG. 8 is an additional perspective view of the actuation assembly shown in FIG. 7.
Figure 9:
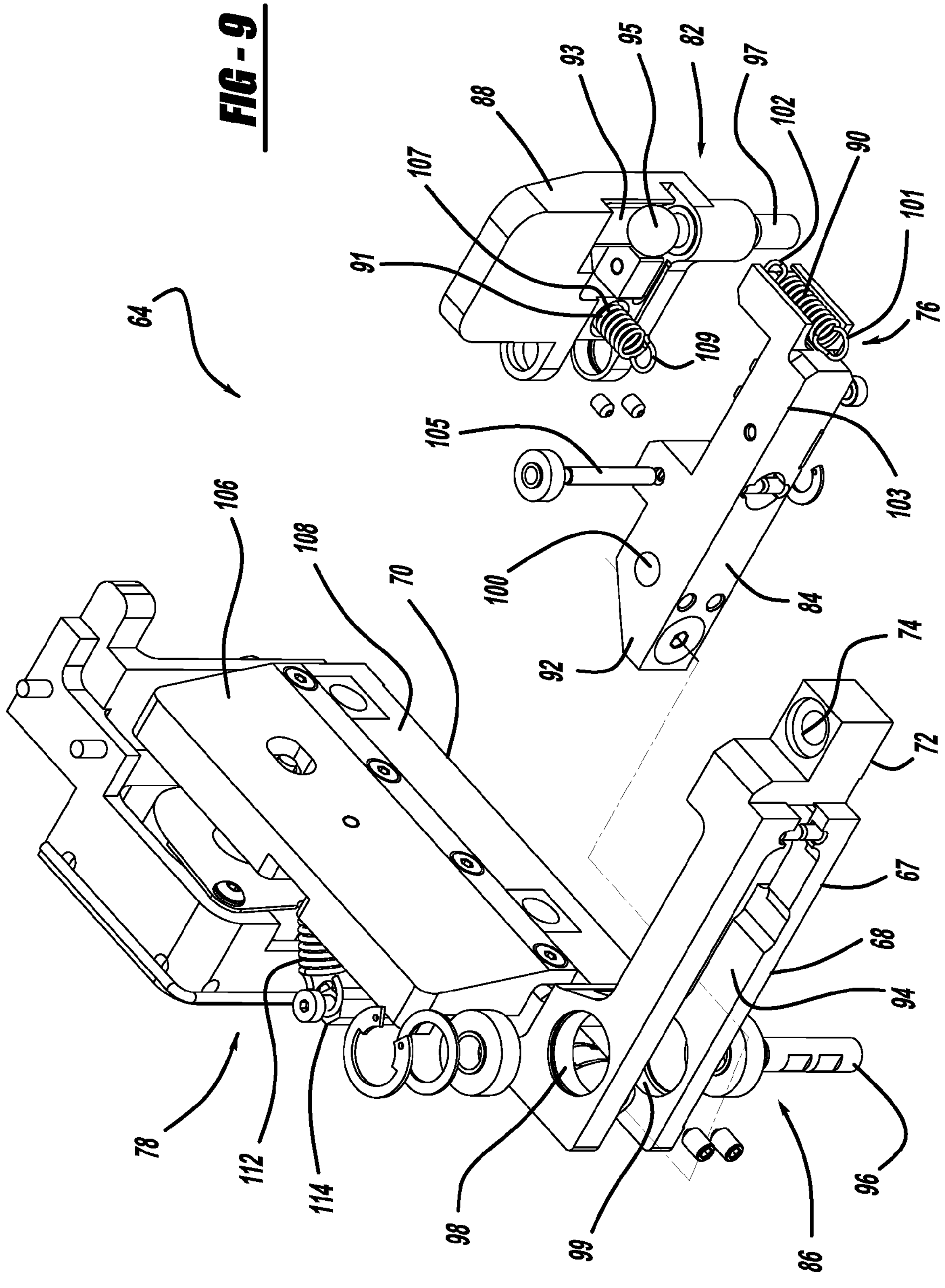
FIG. 9 is a partially exploded perspective view of the actuation assembly shown in FIG. 7.
Figure 10:
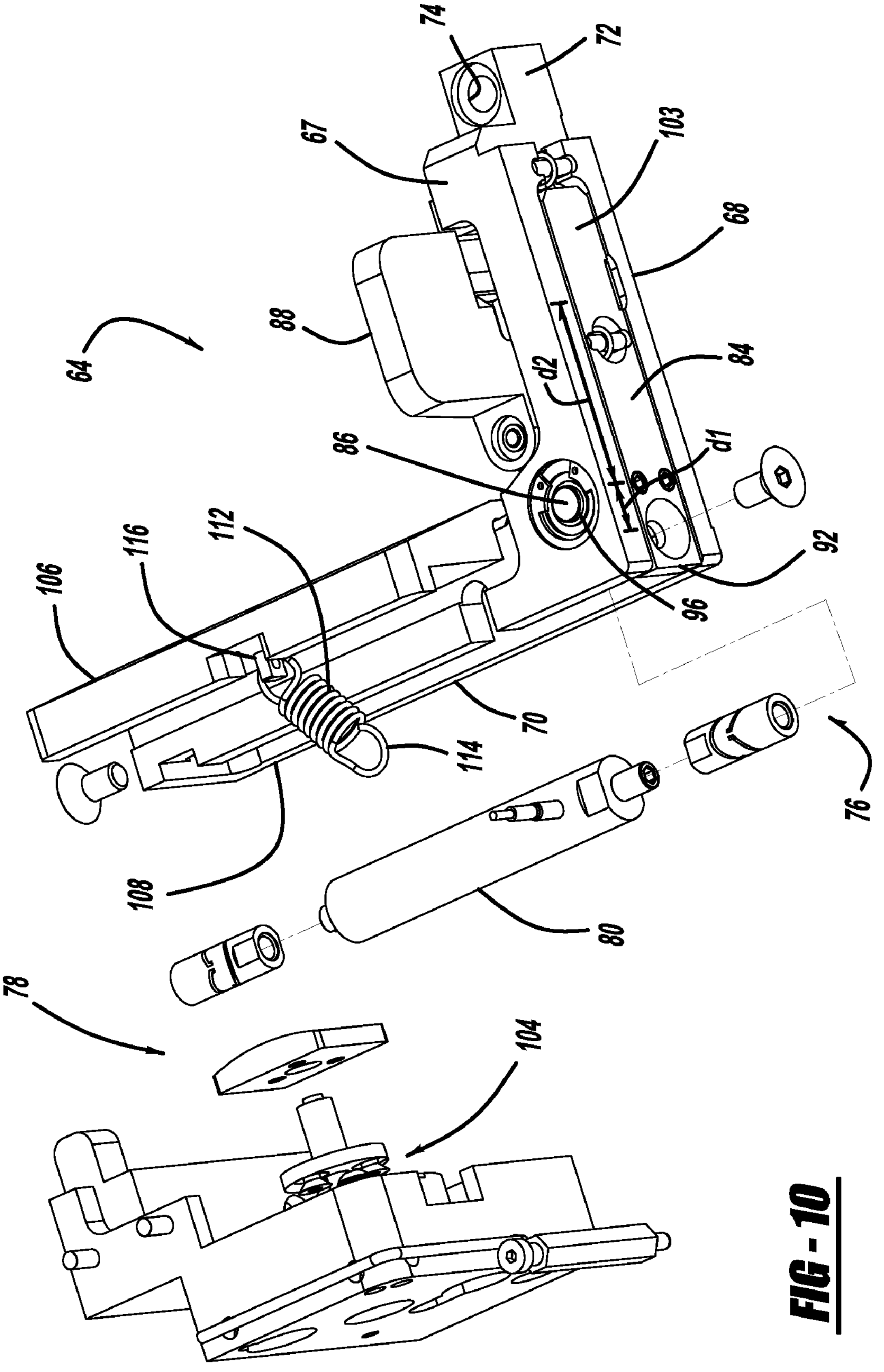
FIG. 10 is an additional partially exploded perspective view of the actuation assembly shown in FIG. 7.

As seen in FIG. 6, printhead 52 and datum block 50 may be isolated from the rest of the printhead assembly 46 and from printhead alignment assembly 40 by a spring bias mechanism 54. Spring bias mechanism 54 may include a mounting plate 56 coupled to printhead assembly body 48 by four springs 58. Each spring 58 may be a compression spring having first and second ends 60, 62. First end 60 of each spring 58 may be coupled to printhead assembly body 48 and second end 62 of each spring 58 may be coupled to mounting plate 56. As a result, mounting plate 56 may be generally movable relative to printhead assembly body 48 with approximately six degrees of freedom. Datum block 50 may be coupled to mounting plate 56 forming a printhead attachment block, giving datum block 50 the freedom to seat kinematically against datum surfaces, discussed below, and be adjusted relative thereto.

As described above, and shown in greater detail in FIG. 3, printhead alignment assembly 40 may be coupled to base plate 28. In addition to providing a mounting surface for printhead alignment assembly 40, base plate 28 may provide a common primary datum reference in the vertical direction for all printheads 52 (referenced to their datum blocks 50) within the array (within about 25 micron/m). The plurality of clearance slots 42 in base plate 28 may generally allow printheads 52 to project therethrough once they are properly aligned to carry out a print function. Printhead assemblies 46, and thus printheads 52, may be arranged generally parallel to each other and at an arbitrary angle of attack with respect to the print axis. This angle may be set according to the desired print resolution of the array.

Each printhead alignment assembly 40 may include a socket 63. Socket 63 may include an actuation assembly 64 and a locking mechanism 66. With additional reference to FIGS. 7-10, actuation assembly 64 may include an L-shaped member 67 having first and second legs 68, 70. A free end 72 of first leg 68 may have an aperture 74 therethrough and may be pivotally coupled to base plate 28. Actuation assembly 64 may further include a phase adjustment assembly 76 and a pitch adjustment assembly 78.

Phase adjustment assembly 76 may be located near first leg 68. Phase adjustment assembly 76 may include a PZT actuator 80, an adjustment mechanism 82, a pivot arm 84, a pivot assembly 86, a secondary datum 88, and first and second return springs 90, 91. PZT actuator 80 may be coupled to and extend along the length of second leg 70 toward first leg 68 and pivot arm 84. PZT actuator 80 may be coupled to a first end 92 of pivot arm 84. First leg 68 may include a recessed portion 94 housing pivot arm 84 therein. Pivot assembly 86 may include a pivot 96 passing through apertures 98, 99 in first leg 68 and aperture 100 in pivot arm 84, pivotally coupling pivot arm 84 to first leg 68. Return spring 90 may be a compression spring having a first end 101 coupled to first leg 68 and a second end 102 coupled to pivot arm 84. As such, return spring 90 generally urges pivot arm 84 toward first leg 68. Secondary datum 88 may be rotatably coupled to first leg 68 by pivot 105 and engagable with a second end 103 of pivot arm 84, discussed below. Return spring 91 may be a compression spring having a first end 107 coupled to secondary datum 88 and a second end 109 coupled to pivot arm 84, generally urging secondary datum 88 toward pivot arm 84. Adjustment mechanism 82 may include a spherical member 95 and an adjustment screw 97. Spherical member 95 may generally seat against pivot arm 84 and a ramped surface 93 of secondary datum 88. Adjustment screw may vary the vertical extent of spherical member along ramped surface 93 to control an initial orientation of secondary datum 88 about pivot 105.

Pitch adjustment assembly 78 may include a linear actuator 104 fixed to base plate 28 and a tertiary datum 106 coupled to second leg 70 of L-shaped member 67. Linear actuator 104 may be located near and selectively engagable with tertiary datum 106 near a free end 108 of second leg 70. A pivot 110 (seen in FIG. 3) may be located in aperture 74 of L-shaped member 67, generally allowing pivotable rotation thereof when linear actuator 104 acts on free end 108, discussed below. Pitch adjustment assembly 78 may also include a return spring 112 to urge tertiary datum 106 into engagement with linear actuator 104. Return spring 112 may be a compression spring having a first end 114 coupled to base plate 28 and a second end 116 coupled to L-shaped member 67.

As seen in FIG. 3, locking mechanism 66 may include a magnetic clamp mechanism 118 housed within L-shaped member 67. Magnetic clamp mechanism 118 may provide a magnetic force acting on datum block 50, discussed below. As such, datum block 50 may be constructed from a paramagnetic material, such as 430 SS.

A three-point leveling system (not shown) may be used to both level and set a working gap of the magnetic clamp mechanism. The goal in setting this gap is to not have the permanent magnet touch the datum block. Thus, the gap may allow the Z position of the printhead relative to the target material to be established by the primary datum points on the base plate 28 that holds magnetic clamp mechanism 118. This may generally allow all of printheads 52 to be at the same Z dimension within about 25 microns of one another. Additionally, when a single surface blotting station is employed, all printheads 52 may not blot properly if they have a different relationship to the blotting cloth. If the air gap is too large, the magnetic retention force drops off as a square of the distance. Thus, preferably the gap is between 25 and 50 microns to stay in a high force region of the magnetic clamping curve without touching metal to metal.

In operation, when a printhead 52 is determined to be offset from its target position, it may be adjusted using the features discussed above. A target position of printheads 52 may generally be defined as an ideal relative alignment between printheads 52 in the printhead array relative to one another (shown in FIG. 11). Specifically, datum block 50 may generally extend over magnetic clamp mechanism 118 and may generally abut secondary and tertiary datums 88, 106. A printhead 52 phase misalignment (shown schematically in FIG. 12) may be corrected using phase adjustment assembly 76. A phase misalignment may occur when a row of printhead nozzles 53 is linearly offset from the target position. Details regarding the determination of a misalignment are discussed below. A printhead 52 may be linearly displaced, as indicated by the arrows in FIG. 11, by phase adjustment assembly 76, as described below.

Magnetic clamp mechanism 118 may be caused to release datum block 50. More specifically, the magnetic retention force imparted to each printhead 52 (datum block) can be varied automatically by pulse-width modulation of bucking coil current to vary force from as high as 80 lbf to 0 lbf. Bucking the magnetic field in the magnetic clamp mechanism 118 allows for release of the printhead for removal from socket 63 or to reposition printhead 52.

Once released, PZT actuator 80 may engage first end 90 of pivot arm 84, causing pivot arm 84 to rotate about pivot 96. Second end 103 of pivot arm 84 may then engage secondary datum 88 causing it to be displaced and engage datum block 50, causing a linear displacement of datum block 50.

More specifically, the distance (d1) between the center of pivot 96 and PZT actuator 80 attachment to first end 92 of pivot arm 84 may be less than the distance (d2) between the center of pivot 96 and the location of engagement between second end 103 of pivot arm 84 and secondary datum 88. As such, displacement imparted by PZT actuator 80 may generally be amplified when applied to secondary datum 88. In the present example, d1 may generally be four times d2, resulting in approximately a four times amplification of the displacement imparted by PZT actuator 80.

When printhead 52 (and corresponding datum block 50) has reached a corrected phase position (shown in FIG. 11), magnetic clamp mechanism 118 may be reactivated and lock datum block 50 in its corrected position. More specifically, once in position, current may be removed from magnetic clamp mechanism 118, re-clamping printhead 52. Because the magnetic clamp mechanism 118 uses electro-permanent magnets, the holding force is "fail-safe". That is, if the power is lost to the PMD, printheads 52 remain clamped in position. Also, use of an electro-permanent magnetic chuck to lock the printheads 52 in position once they are properly aligned may eliminate mechanical distortion, strain, and hysteresis common in mechanical clamps or locks. Additionally, a magnetic holding force of magnetic clamp mechanism 118 may be varied automatically and dynamically. In this manner, the clamping force may be removed momentarily while printhead 52 is position adjusted and then reapplied once printhead 52 is in position.

A printhead 52 pitch misalignment (shown in FIG. 13) may be corrected using pitch adjustment assembly 78. A pitch misalignment may occur when a row of printhead nozzles 53 is rotationally offset from a target. Details regarding determination of the misalignment are discussed below. To correct pitch misalignment, a printhead 52 may be rotated as indicated by the arrows in FIG. 13 using pitch adjustment assembly 78, discussed below.

Magnetic clamp mechanism 118 may be caused to release datum block 50, as described above. Once released, linear actuator 104 may extend to engage free end 108 of second leg 70. When linear actuator 104 engages free end 108, L-shaped member 67 is caused to rotate about pivot 110. Second and tertiary datums 88, 106 engage datum block 50 and cause rotation thereof. When printhead 52 (and corresponding datum block 50) has reached a corrected pitch position (shown in FIG. 13), magnetic clamp mechanism 118 may be reactivated and lock datum block 50 in its corrected position, as described above. The phase and pitch adjustment described above may be automated, as discussed below.

Figure 15:
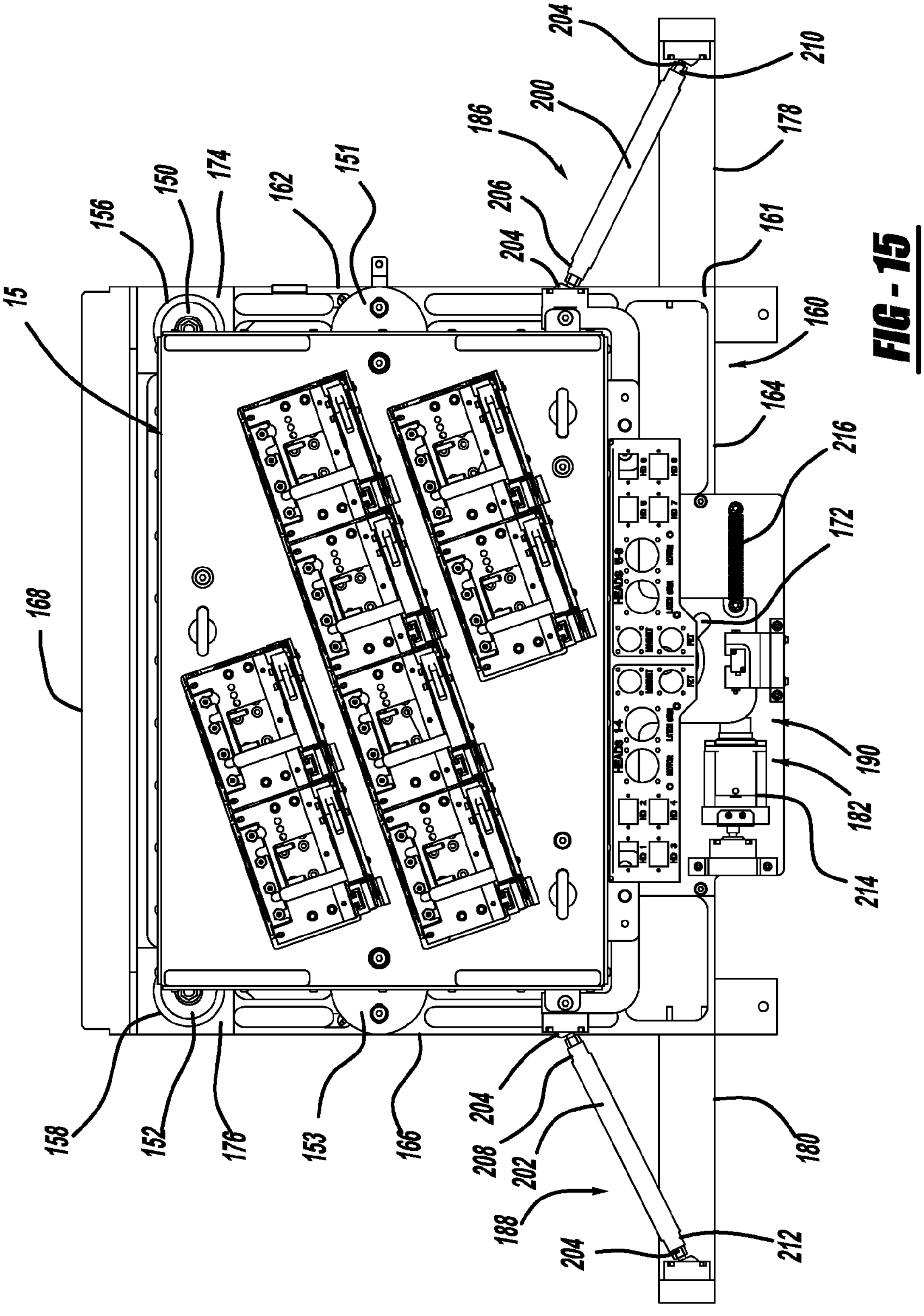
FIG. 15 is a top plan view of the printhead carriage frame shown in FIG. 14.
Figure 16:
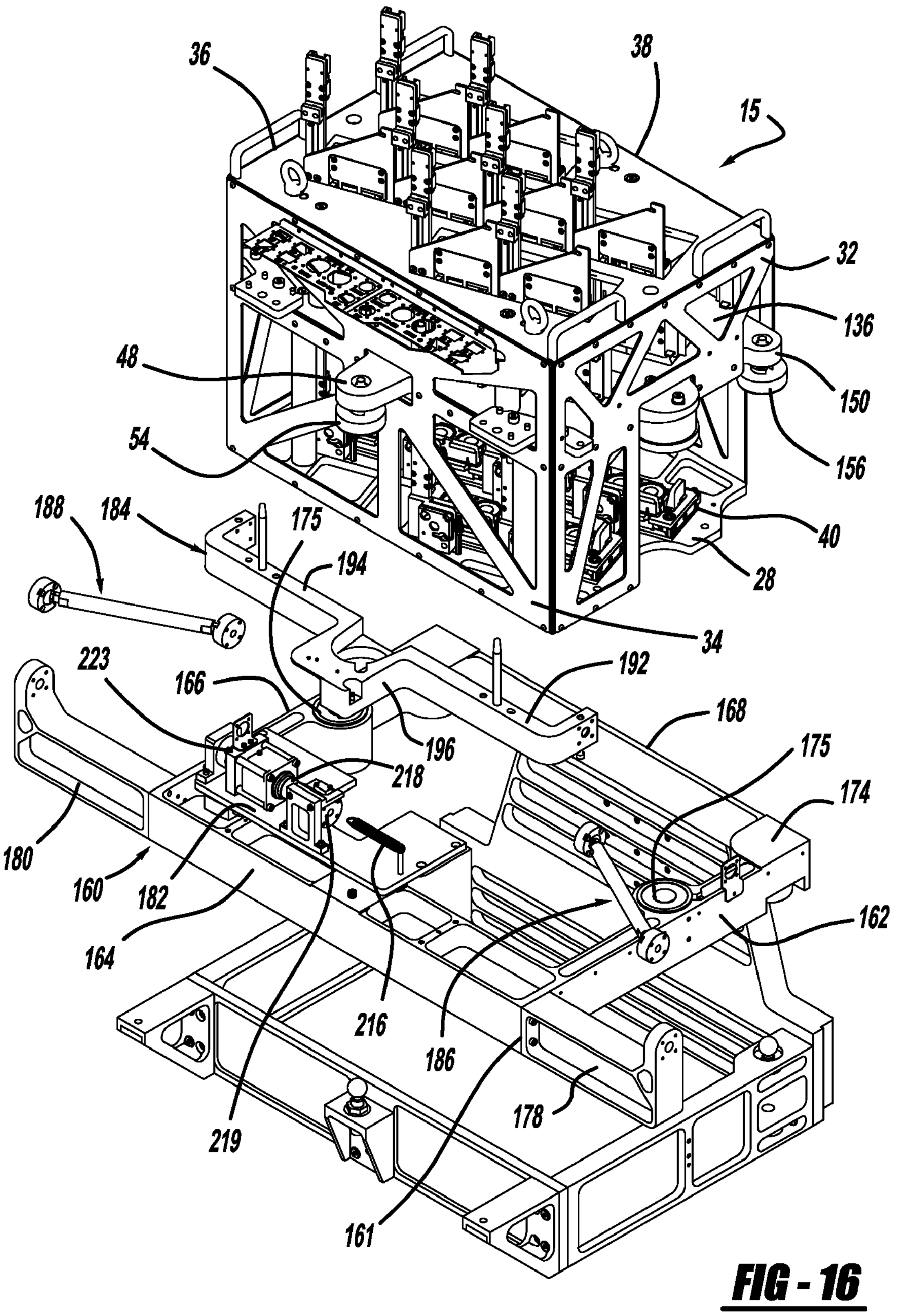
FIG. 16 is a perspective exploded view of the printhead carriage frame shown in FIG. 14.
Figure 17:
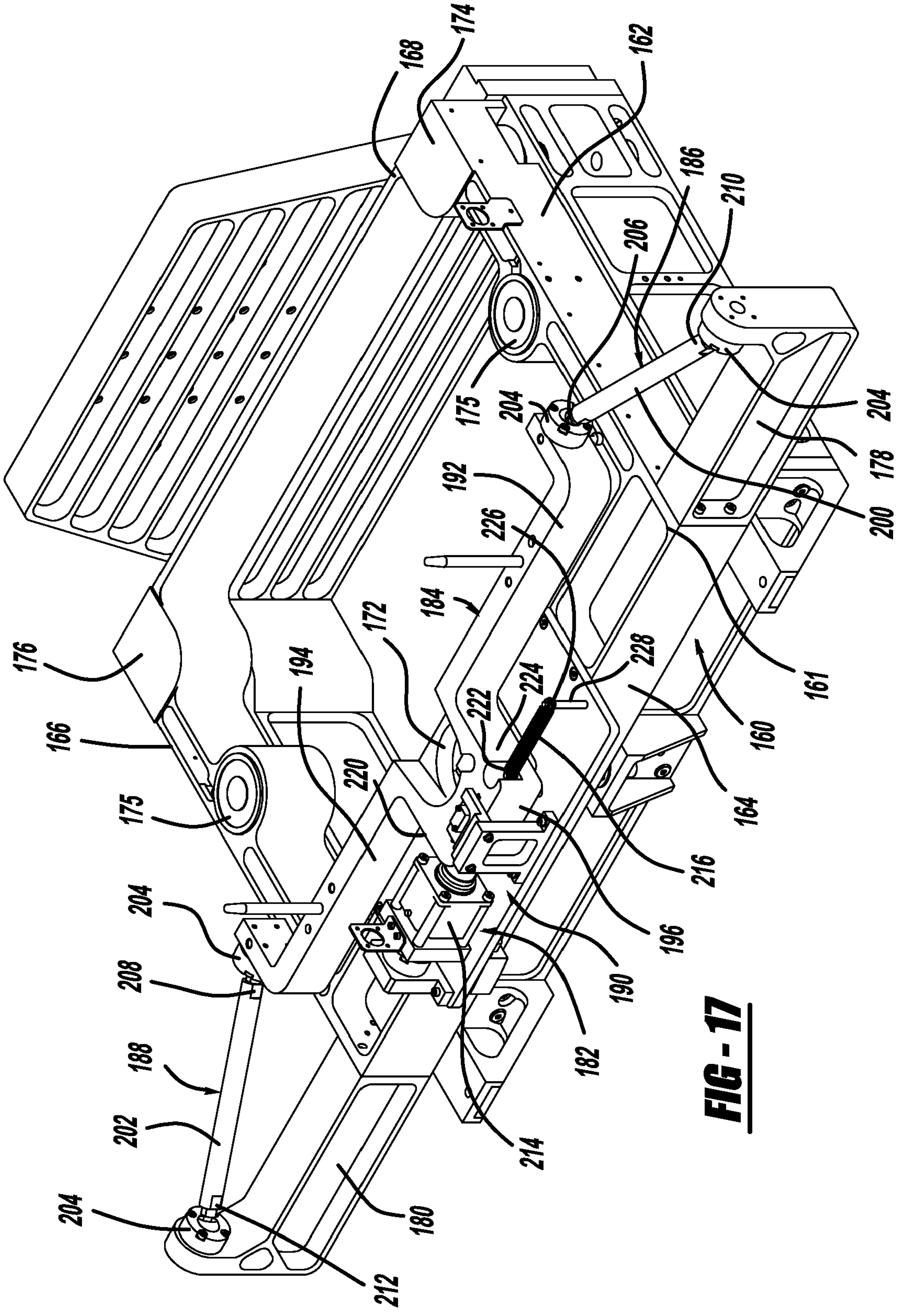
FIG. 17 is a perspective view of the printhead carriage shown in FIG. 14 with the printhead carriage removed.
Figure 18:
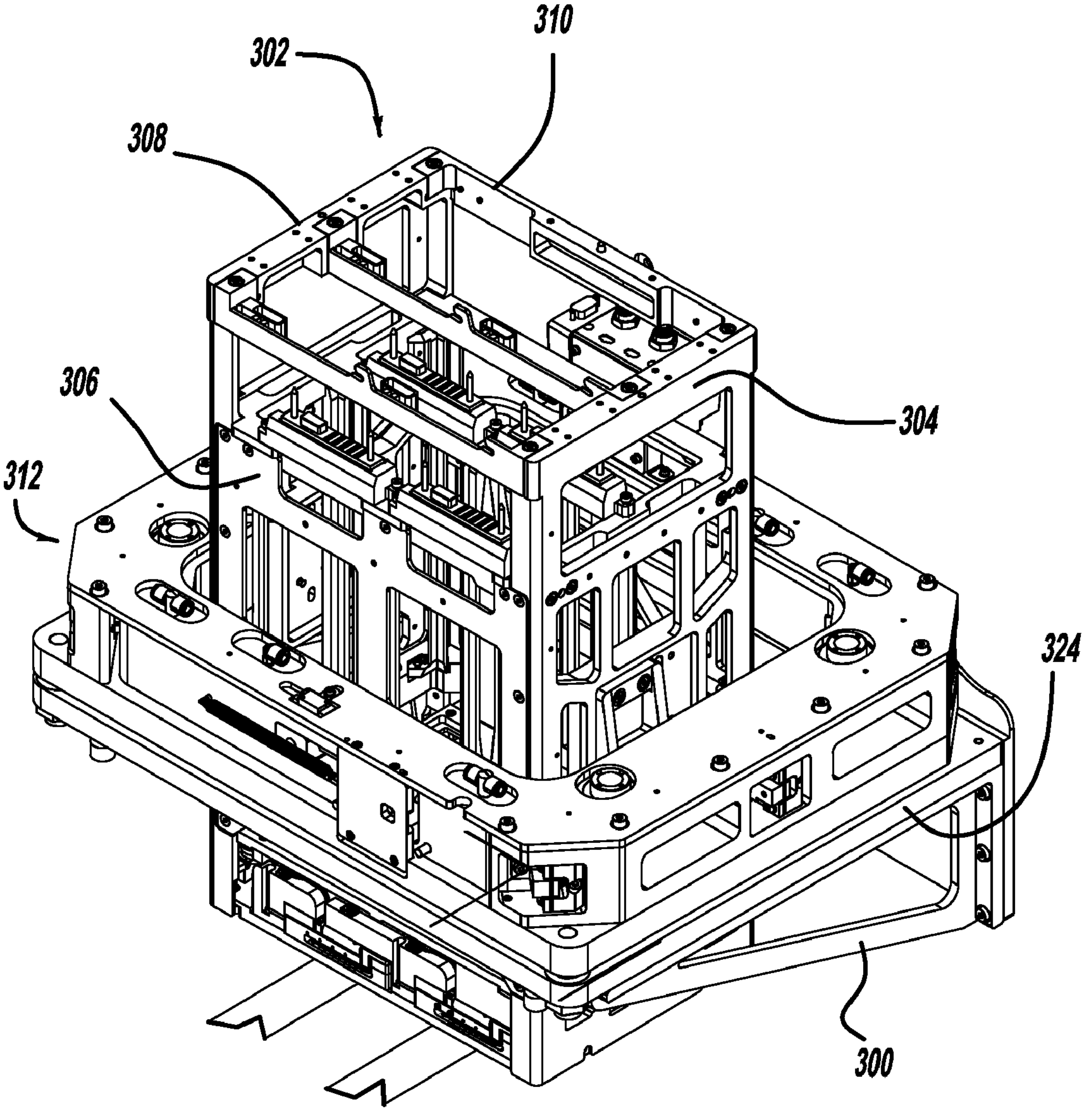
FIG. 18 is a perspective view of an alternate printhead carriage frame according to the present disclosure.
Figure 19:
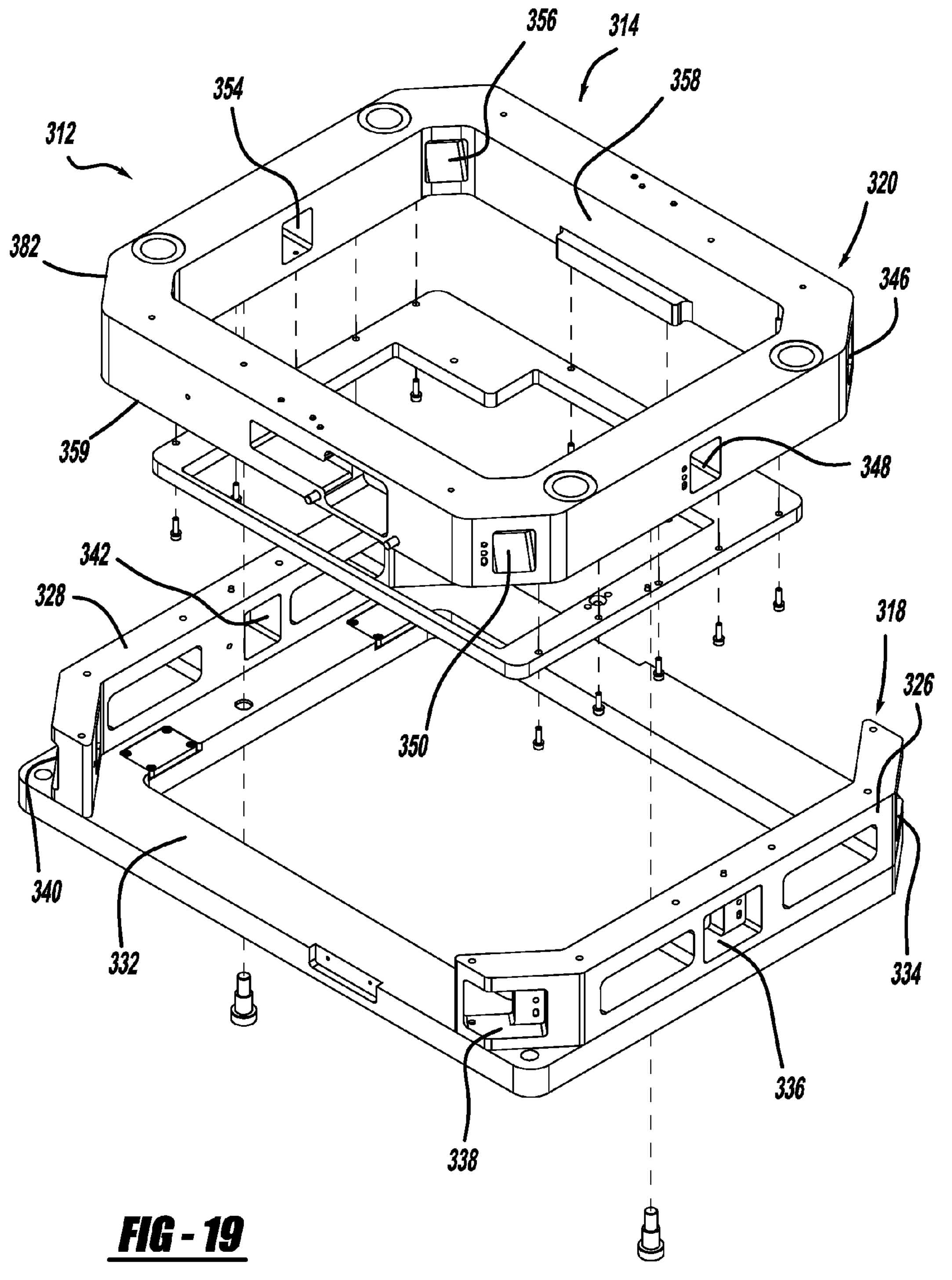
FIG. 19 is a perspective exploded view of a printhead carriage adjustment assembly shown in FIG. 18.

Referring back to FIG. 2, printhead carriage 15 may further include a middle plate 136. Middle plate 136 may include three outrigger mounting portions 148, 150, 152 and two locking members 151, 153 (seen in FIG. 15). Outrigger mounting portions 148, 150, 152 may have air bearing pucks 154, 156, 158 coupled thereto. Air bearing pucks 154, 156, 158 may be height adjusted to level printhead carriage 15 relative to printhead carriage frame 14. Locking members 151, 153 may include ferrous steel discs and may be magnetic. Middle plate 136 may be of a sufficient thickness to support printhead carriage 15.

As previously mentioned, printhead carriage frame 14 may contain printhead carriage 15 therein. With additional reference to FIGS. 14-17, printhead carriage frame 14 may include a base frame structure 160 having an upper surface 161 and four walls 162, 164, 166, 168. Upper surface 161 may include air bearing rotation surfaces 172, 174, 176 and locking members 175. Walls 162, 164, 166, 168 may generally be located around sidewalls 32, 34, 36, 38 of printhead carriage 15. Wall 164 may include arms 178, 180 extending therefrom. Locking members 175 may be electromagnets and may selectively engage and become locked with locking members 151, 153.

Locking members 175 may impart a magnetic retention force to each locking member 151, 153 that can be varied automatically by pulse-width modulation of bucking coil current to vary force from as high as 80 lbf to 0 lbf. Bucking the magnetic field in the locking members 175 allows for release of the locking members 151, 153.

A printhead carriage adjustment assembly 182 may be coupled to upper surface 161 of wall 162 and may be engaged with printhead carriage 15. Printhead carriage adjustment assembly 182 may include an engagement member 184, first and second link assemblies 186, 188, and an actuation mechanism 190. Engagement member 184 may include arms 192, 194 extending along sidewall 34 and partially around sidewalls 32, 36, respectively. An actuation arm 196 may extend between arms 192, 194 and may include a recessed portion 198 therein. Recessed portion 198 may house outrigger mounting portion 148 therein.

First and second link assemblies 186, 188 may each include a link member 200, 202 having spherical bearings 204 at first ends 206, 208 and second ends 210, 212 thereof. Spherical bearings 204 may be coupled to engagement member 184 and printhead carriage frame 14, creating a pivotal engagement between link members 200, 202 and engagement member 184 and printhead carriage frame 14.

Actuation mechanism 190 may include a linear actuator 214 and a bias spring 216. Linear actuator 214 may be coupled to upper surface 161 of wall 164. Linear actuator 214 may include an arm 218 rotatably engaged with a first side 220 of engagement member actuation arm 196 and may be retracted in a direction generally opposite bias spring 216, as indicated by arrow 221 in FIG. 14. The rotatable engagement between arm 218 and actuation arm 196 may include a hephaist bearing 219 having a first end coupled to arm 218 and a second end coupled to activation arm 196. Linear actuator 214 may also have a rotatable engagement with base frame structure 160 through hephaist bearing 223. Bias spring 216 may be an extension spring having a first end 222 coupled to a second side 224 of engagement member actuation arm 196 and a second end 226 coupled to a post 228 fixed to printhead carriage frame 14.

In operation, printhead carriage 15 may be adjusted using the features discussed above. More specifically, the pitch of printhead carriage 15 may be adjusted by rotating printhead carriage 15 through the use of actuation mechanism 190. Upon actuation of linear actuator 214, arm 218 may pull actuation arm 196 toward linear actuator 214. As actuation arm 196 is displaced, link members 200, 202 may pivot about spherical bearings 204, causing rotation of engagement member 184, which translates rotation to printhead carriage 15, indicated by arrow 229 in FIG. 14. More specifically, as arm 218 is retracted, first end 206 of link member 200 may rotate about second end 210 in a counterclockwise direction and first end 208 of link member 202 may rotate about second end 212, resulting in rotation and linear translation of printhead carriage 15. Due to the linkage arrangement, the displacement of printhead carriage 15 may not be purely rotational. Translation of printhead carriage 15 may include some x and y offset, which may be predicted by the motion created by the adjustment assembly 182. The translation may be accounted for by a coordinated move of substrate 18 and printhead carriage 15.

During movement of printhead carriage 15, air bearing pucks 154, 156, 158 may allow for rotation of printhead carriage 15 on air bearing rotation surfaces 172, 174, 176. When a desired position has been attained, air bearing pucks 154, 156, 158 may lock printhead carriage 15 to air bearing rotation surfaces 172, 174, 176.

In an alternate example shown in FIGS. 18-24, a printhead carriage frame 300 may house a printhead carriage 302 and may be coupled to PMD apparatus 10 in a manner similar to that described above regarding printhead carriage frame 14. Printhead carriage 302 may be a generally rectangular member having a series of sidewalls 304, 306, 308, 310. Printhead carriage 302 may be generally similar to printhead carriage 15 and may include printhead alignment assemblies 40 (shown in FIG. 2). A printhead carriage adjustment assembly 312 may be fixed to printhead carriage frame 300 and may contain printhead carriage 302 therein, coupling printhead carriage 302 to printhead carriage frame 300.

With particular reference to FIGS. 19, 20, 22, and 23, printhead carriage adjustment assembly 312 may include a frame assembly 314 and an actuation assembly 316. Frame assembly 314 may include an outer frame 318, an inner frame 320, and coupling elements 322. Outer frame 318 may be fixed to printhead carriage frame 300 by printhead carriage mounting plate 324 and may include a generally rectangular body having first and second sidewalls 326, 328 extending generally upwardly therefrom. Outer frame 318 may further include an upper plate 330 extending from first sidewall 326 to second sidewall 328 and a lower surface 332 forming an air bearing surface. First and second sidewalls 326, 328 may include apertures 334, 336, 338, 340, 342, 344 therethrough.

Inner frame 320 may contain printhead carriage 302 therein. Inner frame 320 may be located between upper plate 330, lower surface 332 and first and second sidewalls 326,

328. Inner frame 320 may include apertures 346, 348, 350, 352, 354, 356 generally corresponding to apertures 334, 336, 338, 340, 342, 344. Inner frame 320 may have a generally rectangular body with a generally open center portion 358 housing printhead carriage 302 therein. A lower surface 359 of inner frame 320 may include air bearing pads 357 for riding over outer frame lower surface 332, and vacuum pads 361 for preventing relative movement between inner frame 320 and outer frame 318.

Figure 20:
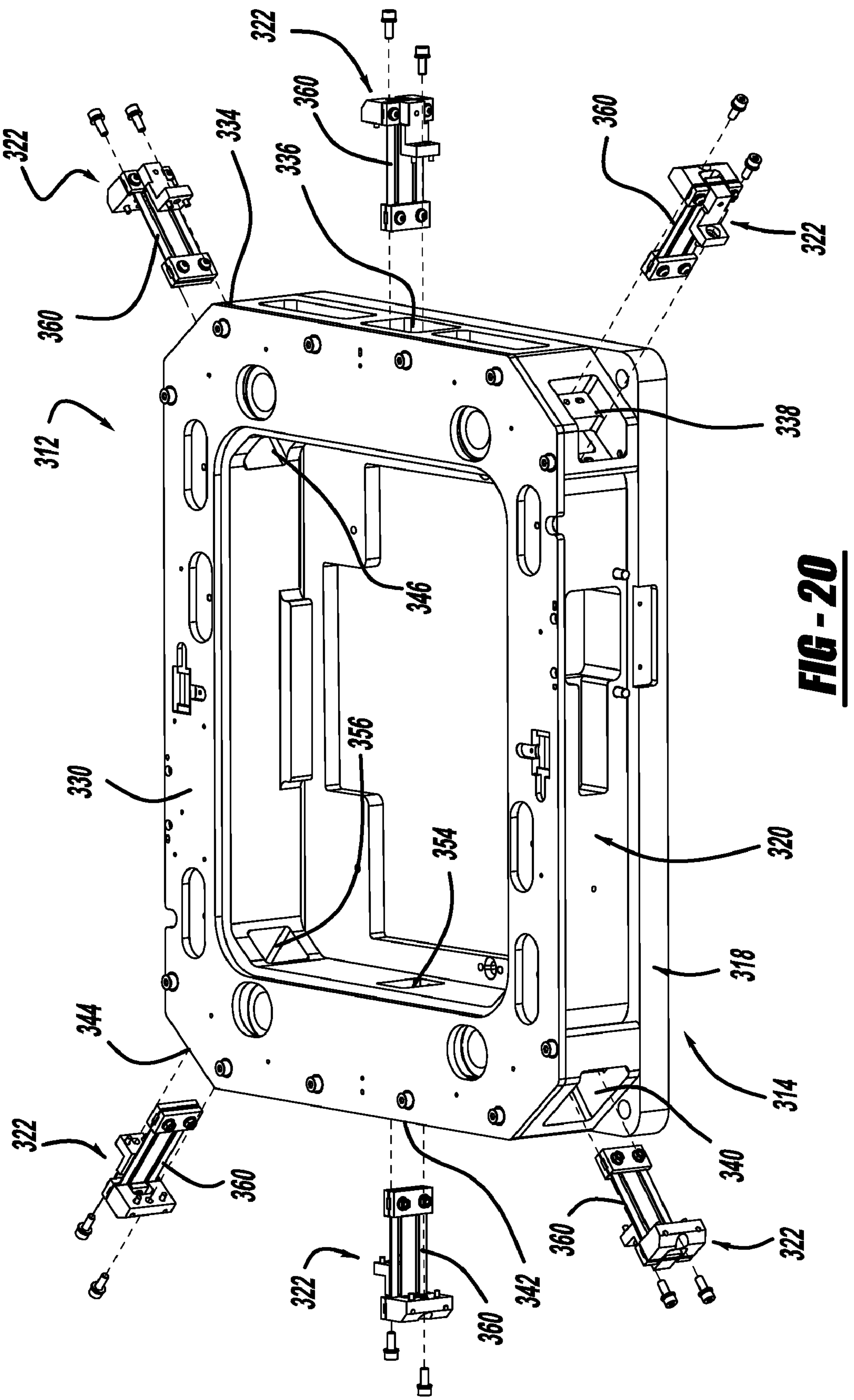
FIG. 20 is an additional perspective partially exploded view of the printhead carriage adjustment assembly shown in FIG. 19.
Figure 21:
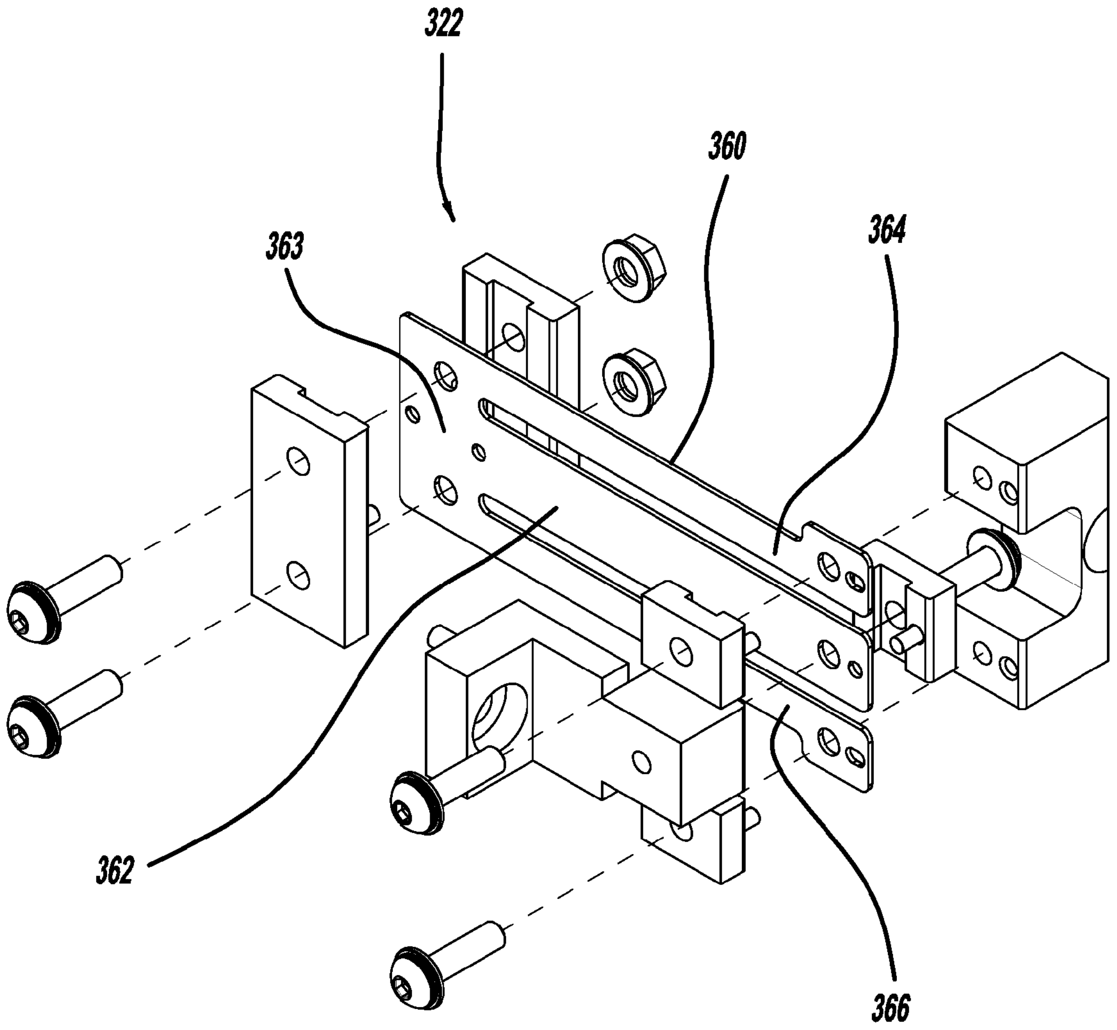
FIG. 21 is a perspective view of a coupling element shown in FIG. 20.

With reference to FIGS. 20 and 21, coupling elements 322 may be located within apertures 334, 336, 338, 340, 342, 344 and apertures 346, 348, 350, 352, 354, 356, and may generally couple inner frame 320 to outer frame 318. More specifically, coupling elements 322 may each include a flexure element 360 generally having a W-shaped configuration. Flexure element 360 may be formed from high fatigue strength sheet metal and may include a base portion 363 having an inner leg 362 and two outer legs 364, 366 extending therefrom. Base portion 363 may be fixed to outer frame 318. Outer legs 364, 366 may be coupled together and fixed to outer frame 318 as well. Inner leg 362 may be fixed to inner frame 320, thereby creating a rotatable coupling between inner frame 320 and outer frame 318.

Figure 22:
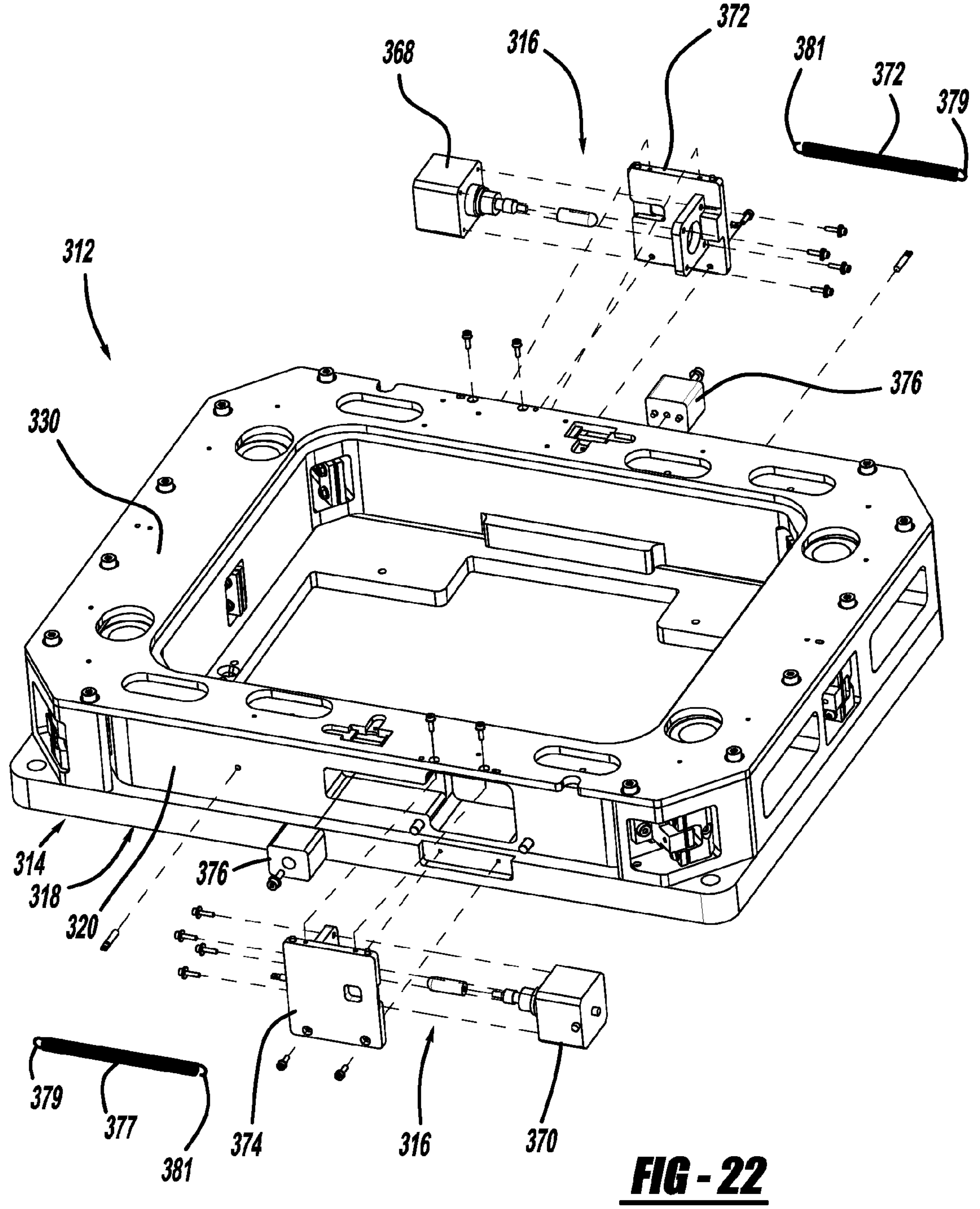
FIG. 22 is an additional perspective partially exploded view of the printhead carriage adjustment assembly shown in FIG. 19.

With reference to FIG. 22, actuation assembly 316 may include a linear actuator 368, 370, housing members 372, 374, and engagement blocks 376. Housing members 372, 374 may be coupled to outer frame 318. Linear actuators 368, 370 may be arranged generally opposite one another and coupled to housing members 372, 374, and therefore outer frame 318. Engagement blocks 376 may be fixed to inner frame 320. A spring 377 may be fixed to inner frame 320 at a first end 379 and may be fixed to housing members 372, 374, and therefore outer frame 318 at a second end 381. Spring 377 may be an extension spring and may generally provide a force urging linear actuators 368, 370 into engagement with engagement blocks 376. Linear encoders 375 may be coupled to upper plate 330 generally above engagement blocks 376.

Figure 23:
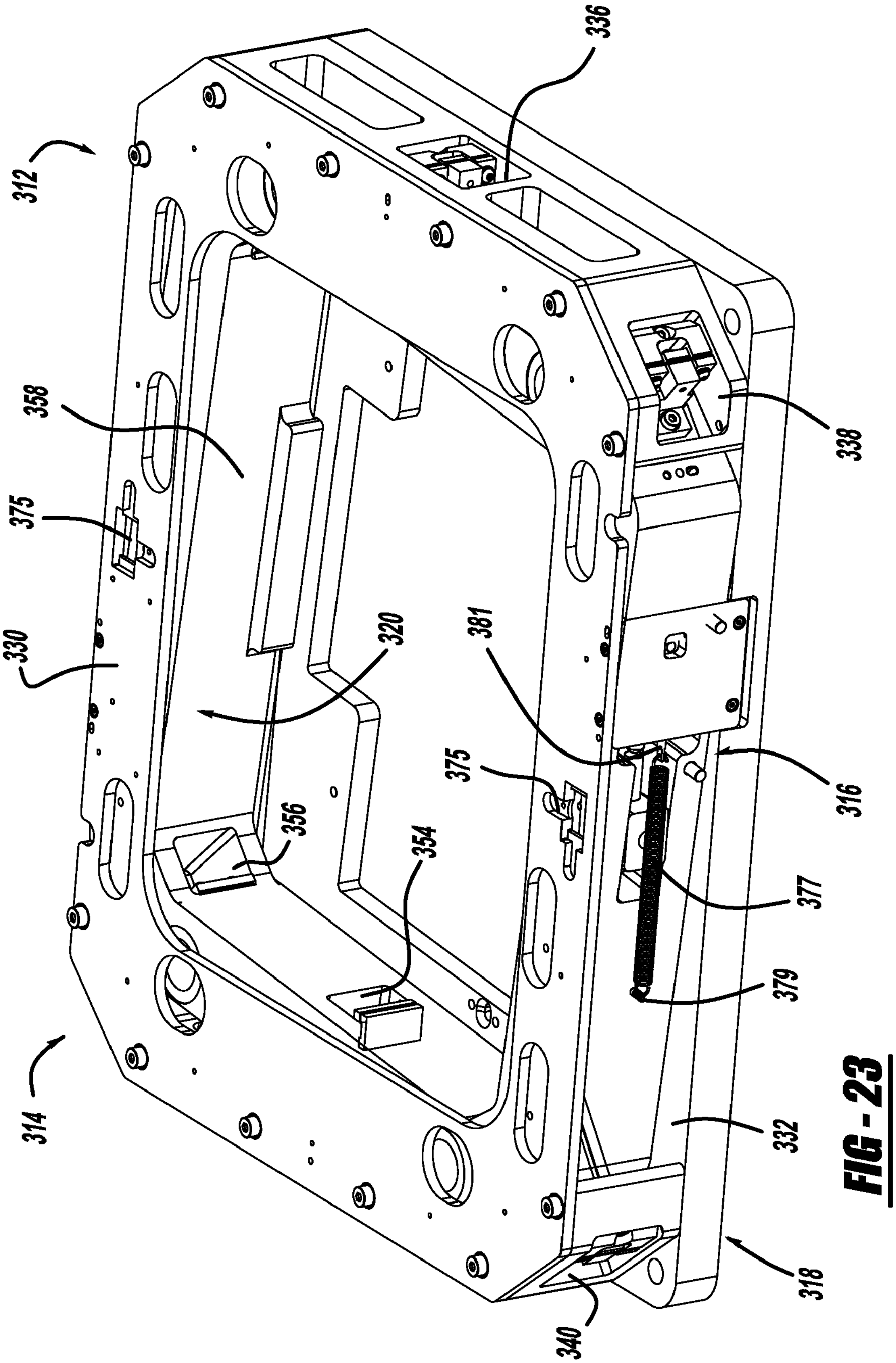
FIG. 23 is a perspective view of the printhead carriage adjustment assembly shown in FIG. 18 in an actuated position.
Figure 24:
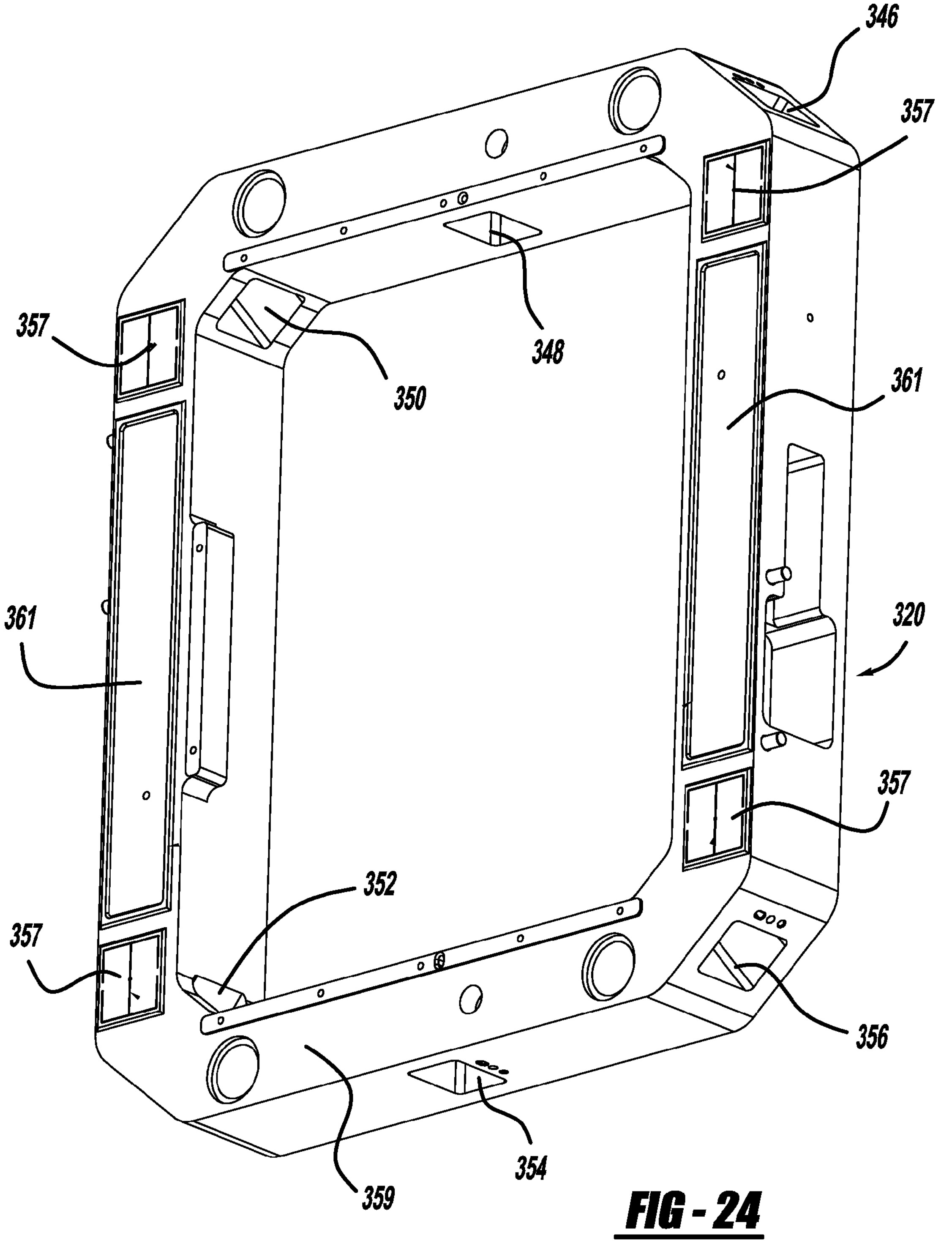
FIG. 24 is a perspective view of a portion of the printhead carriage adjustment assembly shown in FIG. 18.

In operation, when air bearing pads 357 are in an "ON" state, they may generally provide for relative motion between inner frame 320 and outer frame 318. In this state, linear actuators 368, 370 may act on engagement blocks 376. Engagement blocks 376 may impart the applied force on inner frame 320, which is thereby caused to rotate relative to outer frame 318, as seen in FIG. 23. It should be noted that the actuation shown in FIG. 23 is exaggerated for illustrative purposes. Actual rotation of inner frame 320 may be generally 1.5 degrees relative to outer frame 318. Since printhead carriage 302 is contained within inner frame 320, as inner frame 320 rotates, printhead carriage 302 is caused to rotate as well. More specifically, flexure elements 360 are caused to splay open like a "wishbone," providing a biasing force against rotation of inner frame 320. A constant center of rotation may be maintained by linear actuators 368, 370 acting as a force couple.

This force couple may be achieved through precise placement of linear actuators 368, 370, so that equal and opposite forces may be applied. However, due to variation present in manufacturing operations, it may be necessary to adjust linear actuators 368, 370 for positional errors. In order to compensate for positional errors, linear actuators 368, 370 may provide different forces from one another. Using linear encoder 375 located above engagement blocks 376, a commanded rotation may relate to some linear distance traveled. During setup of the stage motion controller, the rotation of the stage can be monitored and mapped. A relationship may then be determined between angle of rotation and encoder position. With position feedback, the applied moment may be resolved automatically. Once a desired position has been attained, air bearing pads 357 may be turned "OFF" and vacuum pads 361 may be turned "ON," locking inner frame 320 relative to outer frame 318.

Linear actuators 368, 370 may rotate the inner frame "on the fly." Under this mode, small rotations may be necessary to correct for inaccuracies in the translational motion of either the printhead array stage or the substrate stage. Errors that cause an angular misalignment between the printhead array and substrate 18 are known as yaw errors. Yaw errors may be present in both the printhead and the substrate stages. A mapping may be done for both the printing axis (axis that printhead carriage frame 14 translates along) and the substrate axis (axis that substrate 18 translates along). The yaw angle about a vertical centerline relative to PMD apparatus 10 may be measured and stored in computer 922 as a motion map. These measurements may be taken using a device such as a laser interferometer.

Typical error magnitudes for precision X-Y stages may be in the range of 20-40 arc seconds. This error range may result in a print position error of 40 to 80 microns in PMD apparatus 10 (FIG. 1). This error may be eliminated by rotation of a printhead array in an angular fashion. The amount of rotation may be the sum of the rotation error for the printing axis along X stage 20 and the rotation error for substrate 18 at a particular distance along Y stage 22. Using a map for each axis computer 922 may dynamically sum calculated errors and command a printhead rotation to compensate for the errors. The printhead correction angle may be in increments as small as 0.02 arc-seconds. The correction may be applied at an interval of approximately 2000 times per second, which may translate to an angular correction in the printhead array every 0.5 mm of travel of the substrate when printing at a rate of 1 meter/sec. Using this method, printhead array positioning may be adjusted to account for structural irregularities in PMD apparatus 10. Specifically, deviations in the X and Y stages 20, 22 relative to an ideal orientation may be accounted for.

Figure 25:
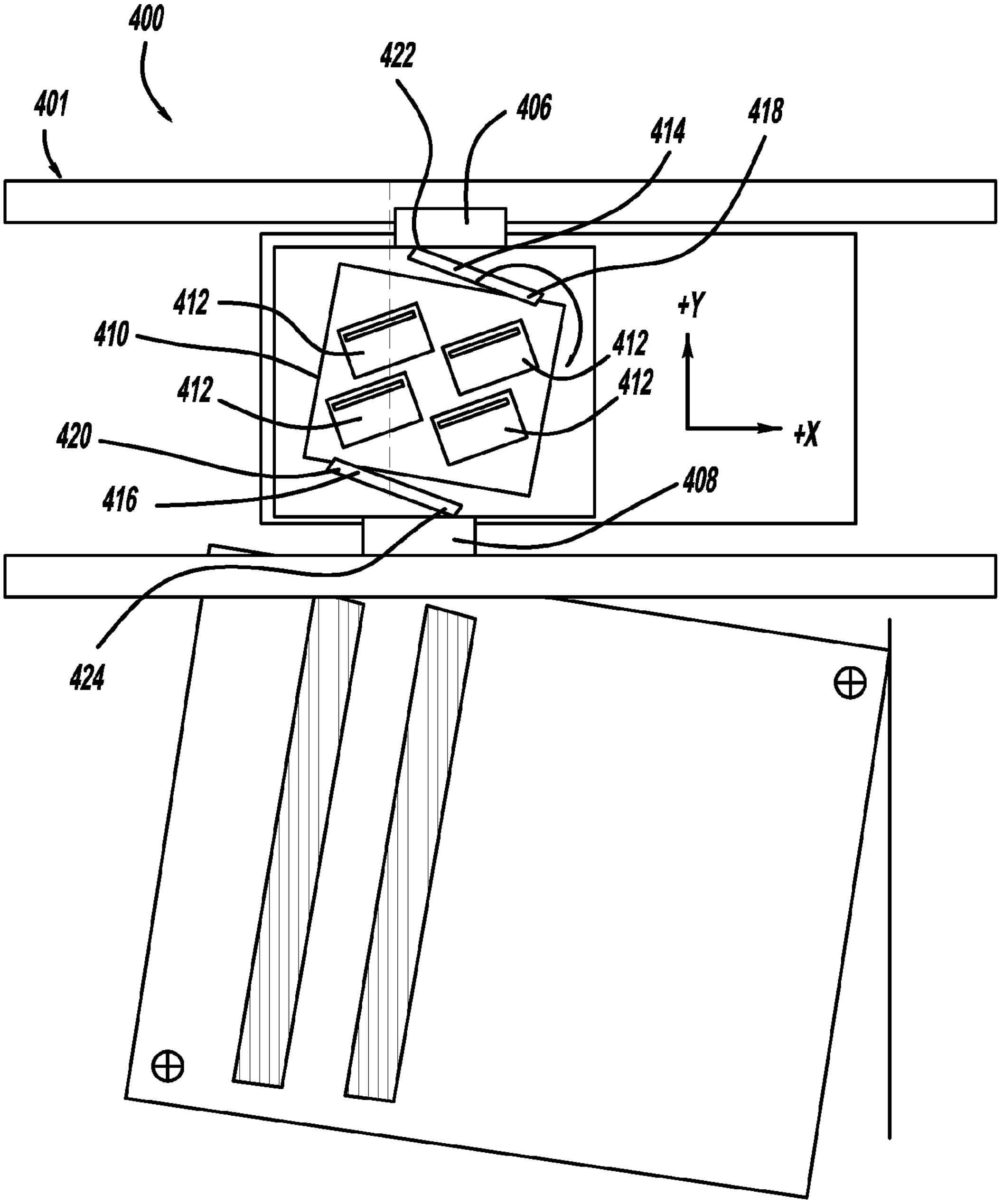
FIG. 25 is a schematic view of an alternate printhead carriage adjustment assembly.
Figure 26:
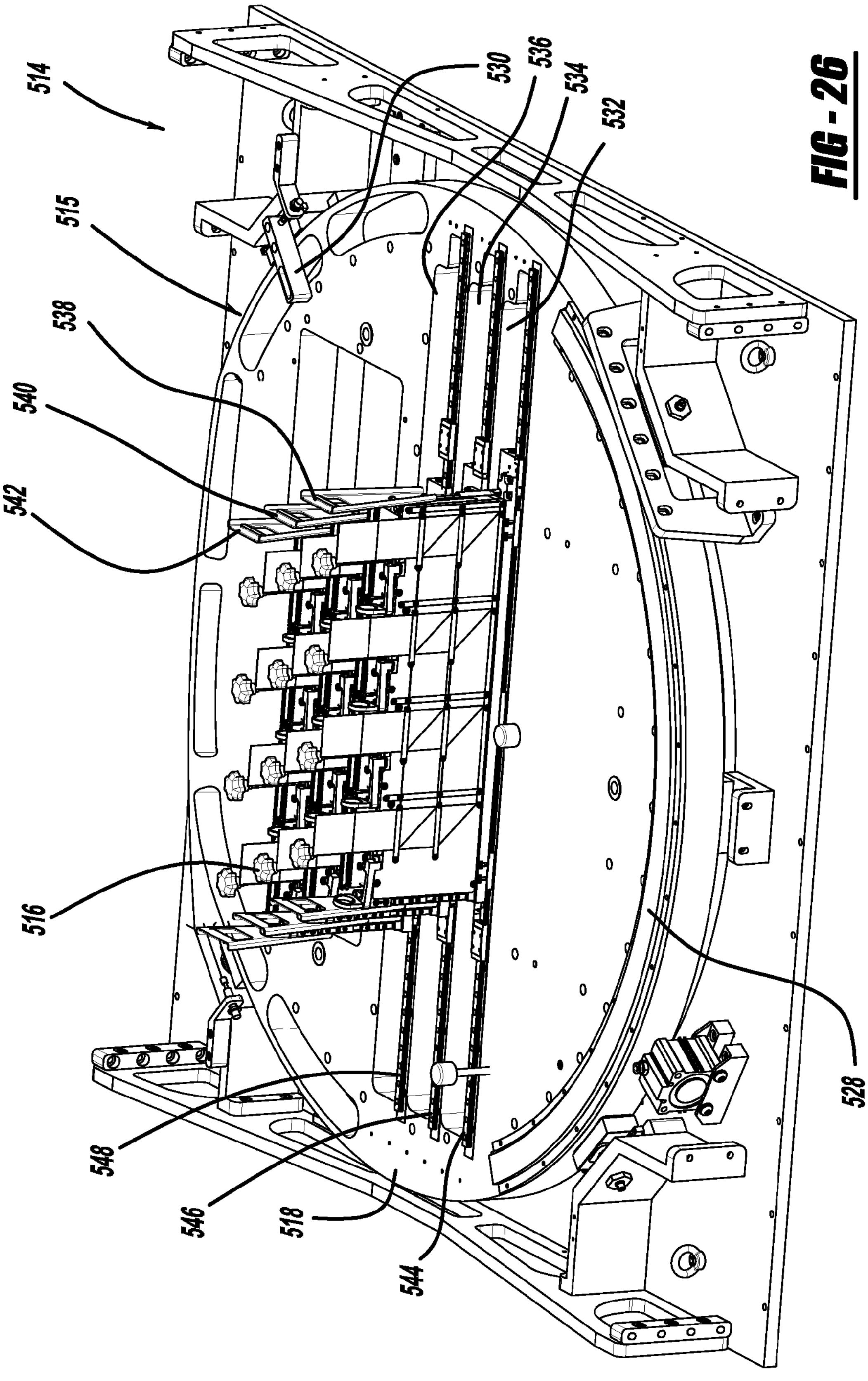
FIG. 26 is a perspective view of an alternate printhead carriage frame.
Figure 27:
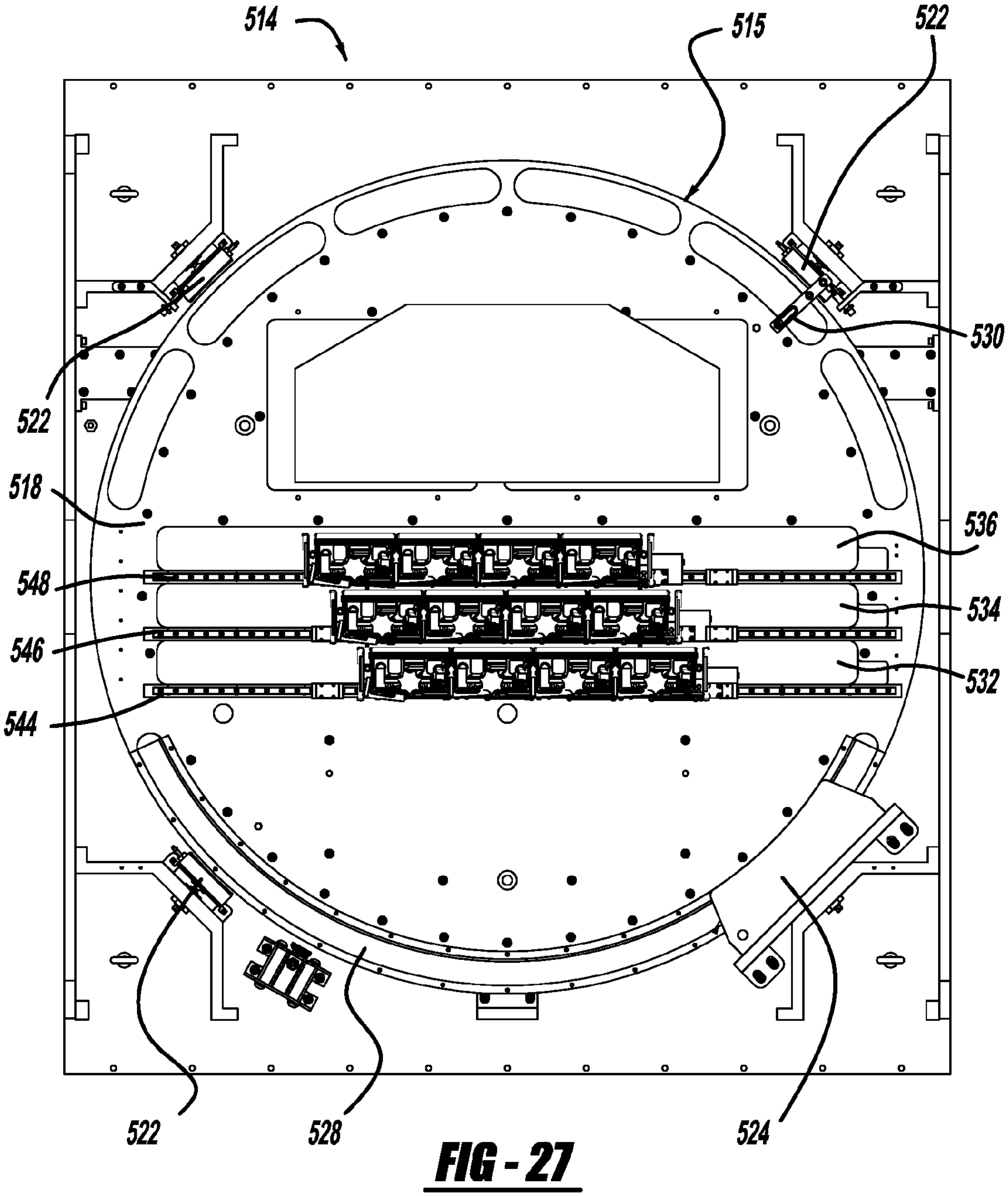
FIG. 27 is a top plan view of the printhead carriage frame of FIG. 26.
Figure 28:
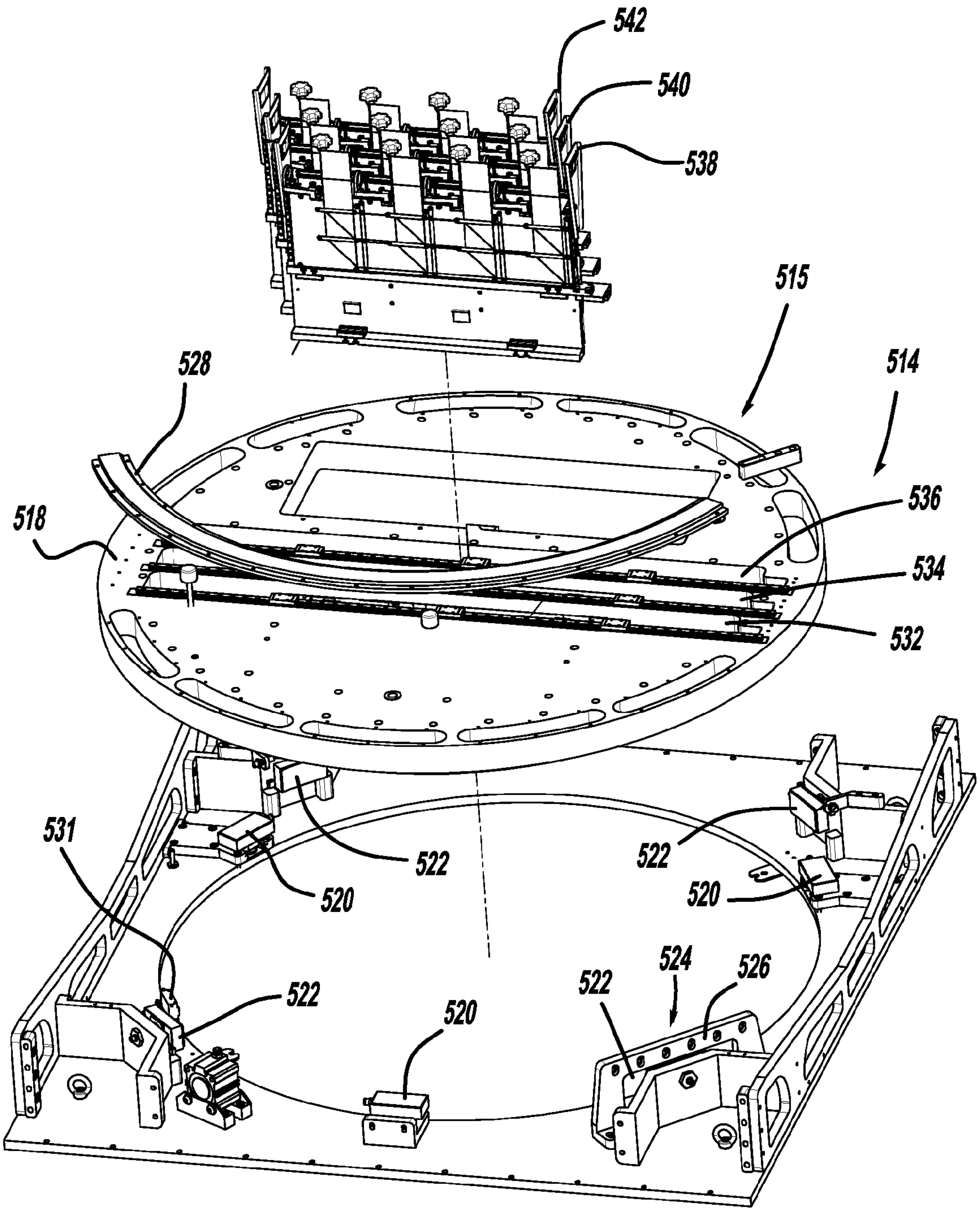
FIG. 28 is a perspective exploded view of the printhead carriage frame of FIG. 26.
Figure 29:
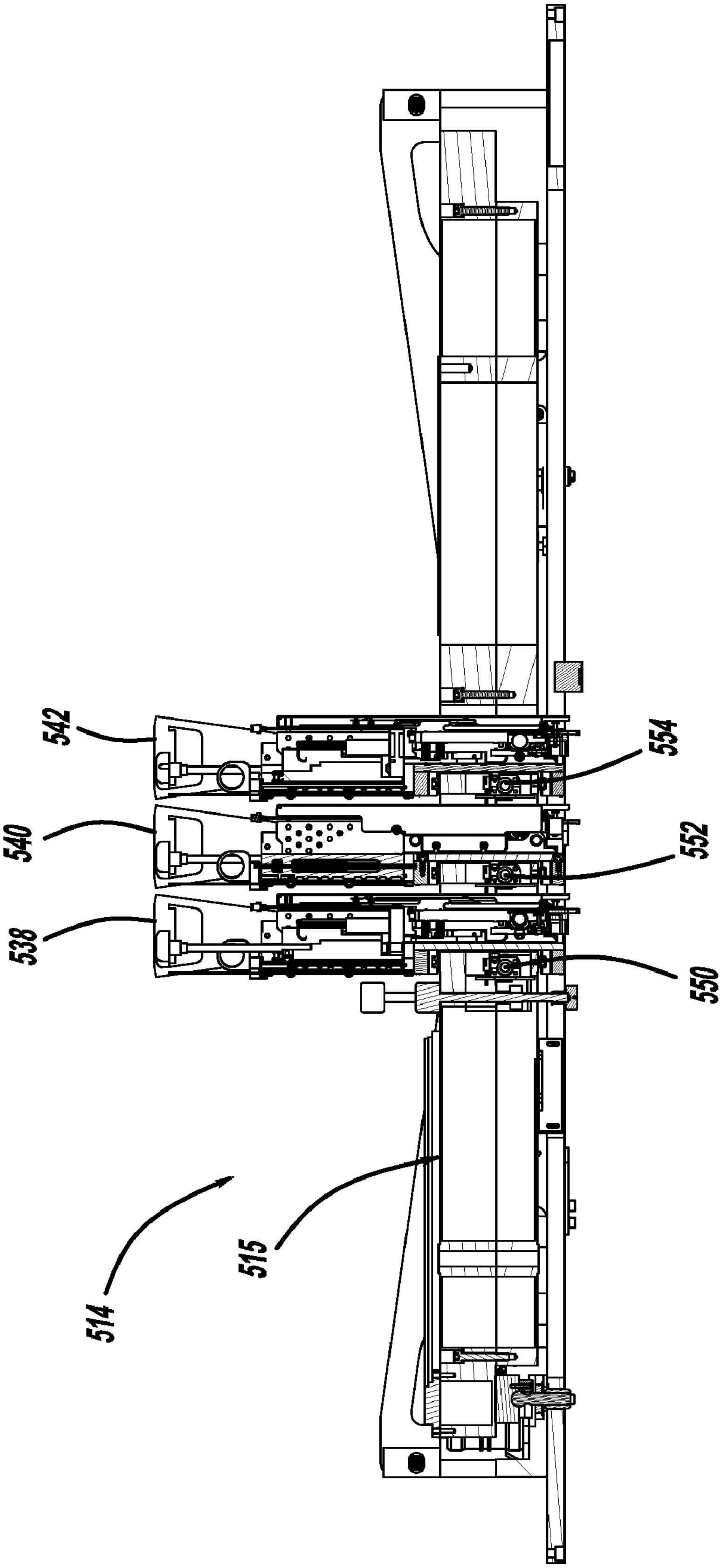
FIG. 29 is a sectional view of the printhead carriage frame of FIG. 26.

Referring to FIG. 25, an alternative printhead array rotary system 400 may be slidably coupled to a PMD apparatus X stage 401 at support rails 402, 404 (generally similar to those shown in FIG. 1). Printhead array rotary system 400 may include linear motion drives 406, 408, a printhead carriage 410 having printhead assemblies 412 contained therein, and linkages 414, 416. Linear motion drives 406, 408 may be engaged with and displaceable along support rails 402, 404. Linkages 414, 416 may be coupled to printhead carriage 410 at first ends 418, 420 and may be coupled to linear motion drives 406, 408 at second ends 422, 424.

In operation, after a rotational error is determined, linear motion drives 406, 408 may be displaced along support rails 402, 404 in directions generally opposite one another. As linear motion drives 406, 408 are displaced relative to one another, linkages 414, 416 are rotated, thereby causing a corresponding rotation of printhead carriage 410. Once in a desired position, linear motion drives 306, 308 may be stopped, fixing printhead carriage 302 in position.

With additional reference to FIGS. 26-29, an alternate printhead carriage frame 514 may house printhead carriage 515 containing printhead assemblies 516 therein. Printhead carriage frame 514 may be coupled to PMD apparatus 10 in a manner similar to that described regarding printhead carriage frame 14. Printhead carriage 515 may include a circular body 518 supported vertically by a first set of air bearings 520 and radially by a second set of air bearings 522 mounted to printhead carriage frame 514.

Printhead carriage frame 514 may include an actuation assembly 524 for rotatably driving printhead carriage 515, providing a pitch adjustment of printhead carriage 515. Actuation assembly 524 may include a motor winding 526, a magnetic slug 528, a stop 530, and an optical encoder 532. Motor winding 526 may be mounted to printhead carriage frame 514 and magnetic slug 528 may be mounted to an upper portion of circular body 518 to be driven by motor winding 526. Stop 530 may be coupled to printhead carriage frame 514 and may generally extend over circular body 518, limiting travel of printhead carriage 515 through an engagement between stop 530 and magnetic slug 528.

Printhead carriage circular body 518 may include slots 532, 534, 536 housing printhead assemblies 516 therein. More specifically, printhead assemblies 516 may be contained in housings 538, 540, 542 extending into slots 532, 534, 536. Housings 538, 540, 542 may be slidably engaged with linear bearings 544, 546, 548. Slots 532, 534, 536 may further include linear actuators 550, 552, 554 therein for translation of housings 538, 540, 542 along slots 532, 534, 536, providing a phase adjustment of printhead assemblies 516. Further, any initial offset in positioning due to assembly variation or any other source may be accounted for using the vision system described below to reference a fiducial mark on a lower surface of printhead carriage 515.

Figure 4:
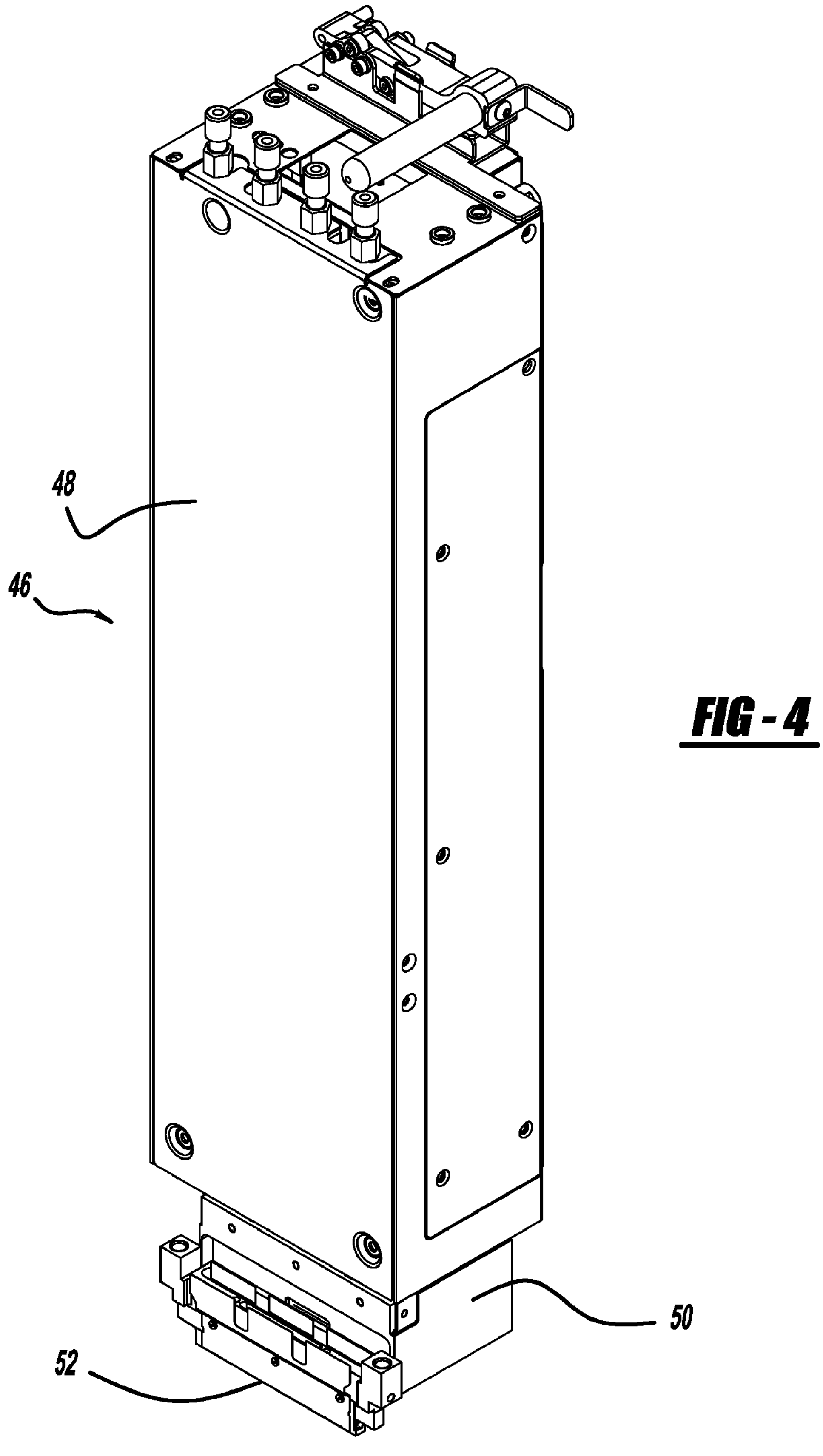
FIG. 4 is a perspective view of a printhead assembly from the printhead carriage assembly of FIG. 2.
Figure 30:
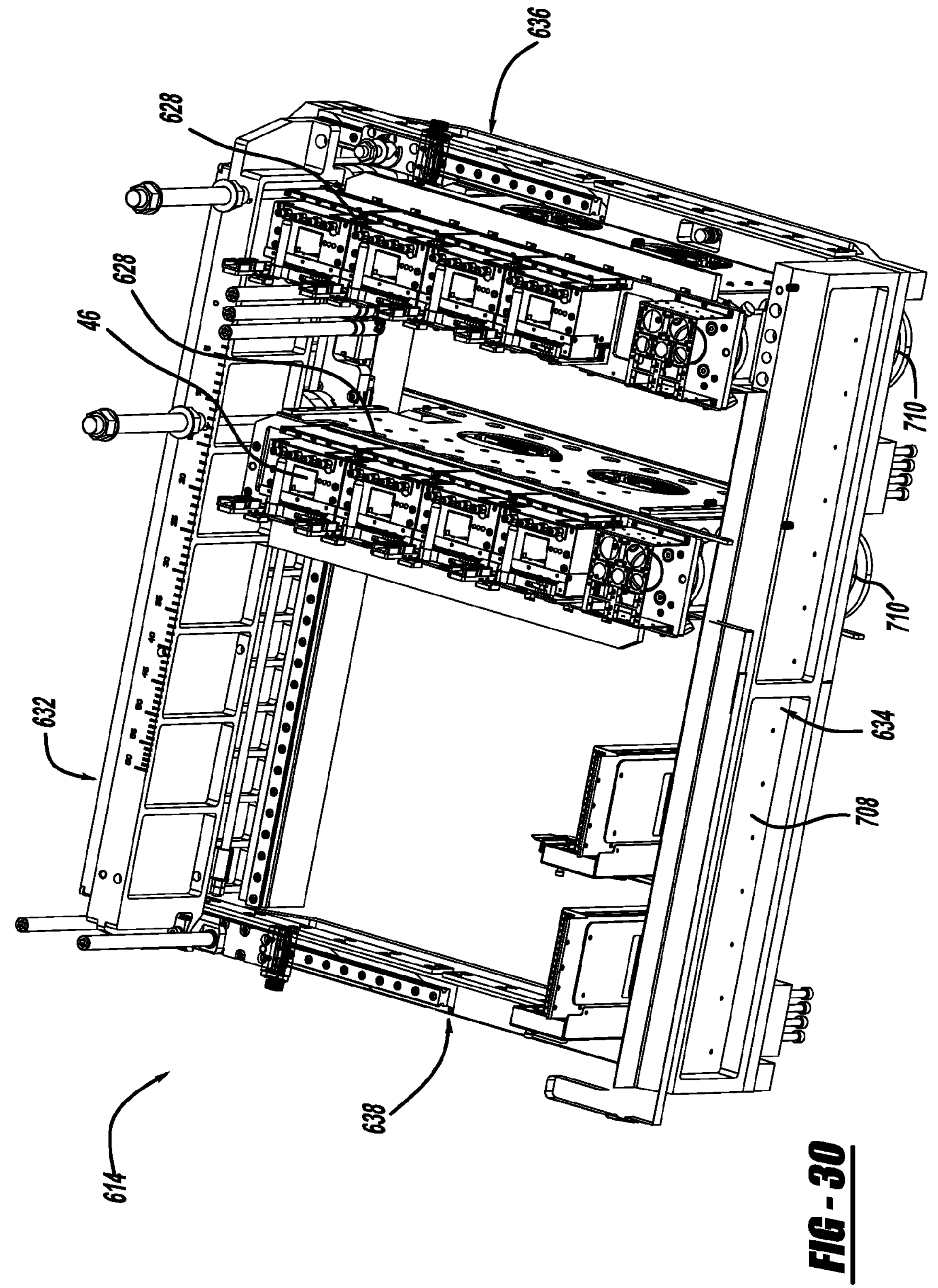
FIG. 30 is a perspective view of an alternate printhead carriage frame according to the present disclosure.
Figure 31:
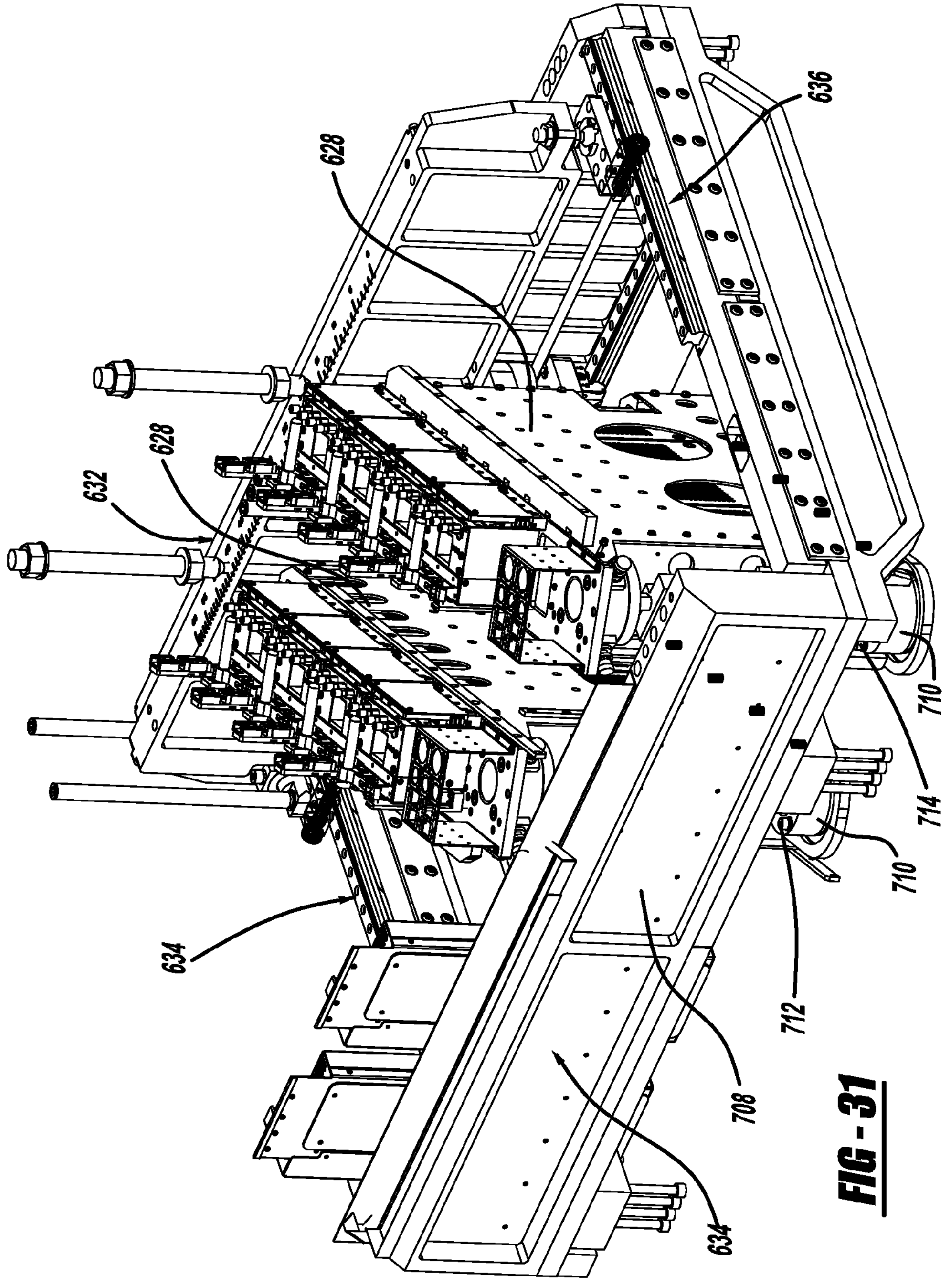
FIG. 31 is an additional perspective view of the printhead carriage frame shown in FIG. 30.

With additional reference to FIGS. 30 and 31, an alternate printhead carriage frame 614 may house printhead carriages 628 containing printhead assemblies 46 therein (shown in FIG. 4). Printhead carriage frame 614 may be coupled to PMD apparatus 10 (FIG. 1) in a manner similar to that described regarding printhead carriage frame 14. Printhead carriages 628 may be rotatably coupled to printhead carriage frame 614. More specifically, printhead carriage frame 614 may include front and rear wall assemblies 632, 634 and sidewall assemblies 636, 638, which cooperate to form a printhead array variable pitch adjustment apparatus, discussed below.

Figure 32:
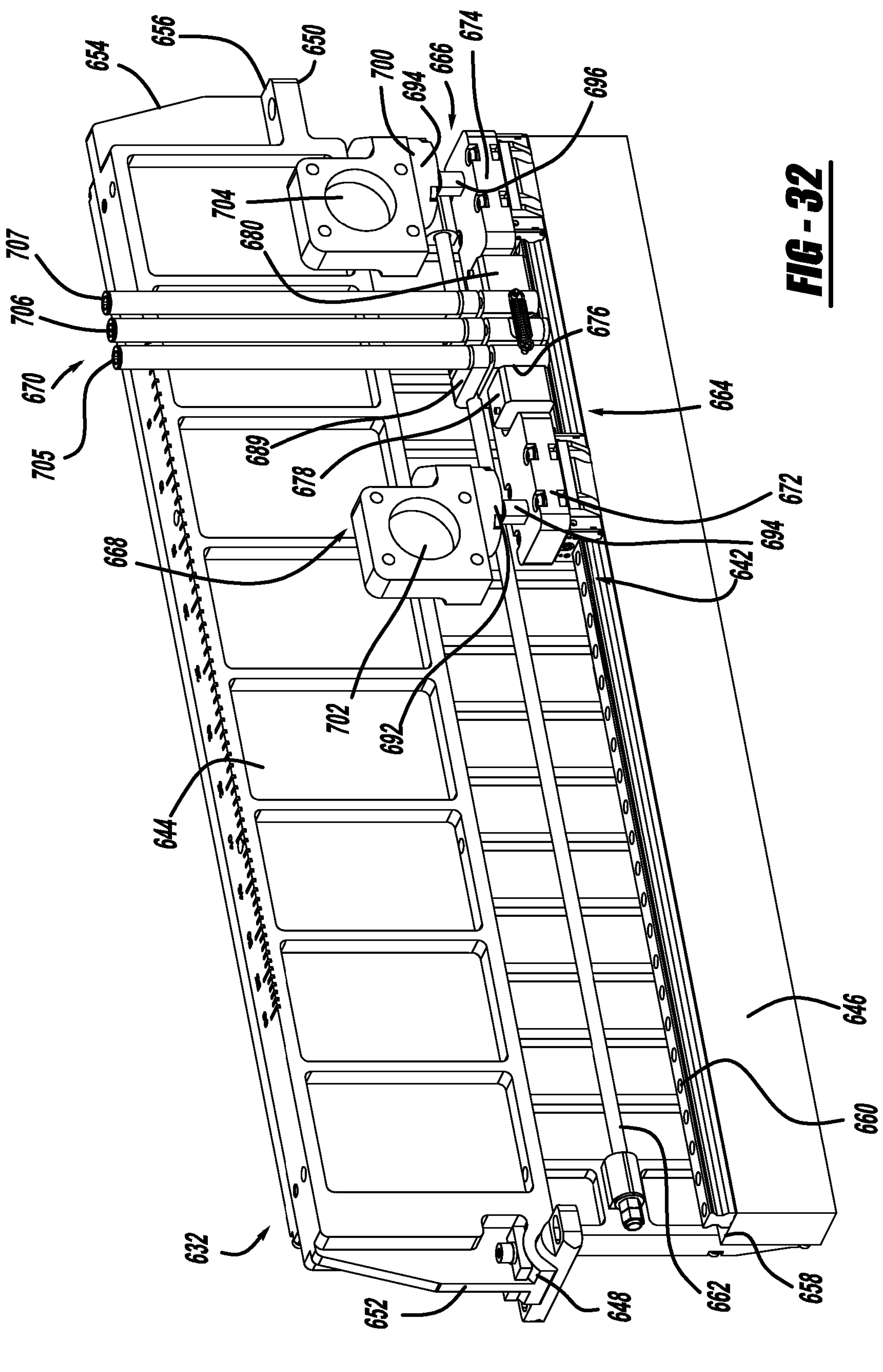
FIG. 32 is a perspective view of a portion of the printhead carriage frame shown in FIG. 30.

With additional reference to FIG. 32, front wall assembly 632 may include a wall member 640 and an adjustment assembly 642. Wall member 640 may include an upper portion 644 and a lower portion 646. Upper portion 644 may include slider portions 648, 650 at ends 652, 654. Slider portion 650 may further include a leveling mechanism 656 to adjust vertical orientation of second end 654, and therefore angular disposition of front wall assembly 632. Additionally, slider portion 648 may also include a leveling mechanism (not shown) so that front wall assembly 632 may be adjusted vertically at both ends 652, 654. Lower portion 646 may include a shelf 658 for supporting a portion of adjustment assembly 642, discussed below.

Adjustment assembly 642 may include a linear slide bearing 660, a rail 662, a slide assembly 664, a pivot assembly 666, a printhead carriage mounting assembly 668, and a locking mechanism 670. Linear slide bearing 660 may extend along shelf 658. Rail 662 may generally extend along a majority of the length of wall member 640 and may be located above linear slide bearing 660. Slide assembly 664 may include first and second end portions 672, 674 with an intermediate portion 676 therebetween, a first motorized actuator 678 located between first end portion 672 and intermediate portion 676 and a second motorized actuator 680 located between second end portion 674 and intermediate portion 676.

First and second end portions 672, 674 may each include support members 686, 688 mounted to lower portions thereof. Support members 686, 688 may be slidably coupled to linear slide bearing 660. Intermediate portion 676 may include an arm 689 slidably coupled to rail 662. Pivot assembly 666 may include pivot members 690, 692 having first ends 694, 696 and second ends 698, 700 rotatable relative to one another. Pivot members 690, 692 may be in the form of hephaist bearings and may have first ends 694, 696 coupled to upper portions of slide assembly first and second end portions 672, 674. Printhead carriage mounting assembly 668 may include mounting blocks 702, 704 for coupling adjustment assembly 642 to printhead carriages 628. Mounting blocks 702, 704 may be coupled to pivot member second ends 698, 700, allowing printhead carriages 628 to rotate relative to wall member 640. Locking mechanism 670 may be coupled to intermediate portion 676 and may include clamping bolts 705, 706, 707 for fixing adjustment assembly 642 relative to wall member 640. Clamping bolt 706 may be tightened to globally secure slide assembly 664, generally allowing minor adjustments of first and second end portions 672, 674 relative to one another through actuation of actuators 678, 680. Clamping bolts 705, 707 may be tightened to secure first and second end portions 672, 674 relative to one another.

Referring back to FIGS. 30 and 31, rear wall assembly 634 may include a wall member 708 and a pivot assembly 710. Wall member 708 may be fixed to sidewall assemblies 636, 638. Pivot assembly 710 may include pivot members 712, 714 having first ends (not shown) and second ends (not shown) rotatable relative to one another. Pivot members 712, 714 may be in the form of hephaist bearings having first ends (not shown) fixed to wall member 708. Mounting blocks 724, 726 may be coupled to second ends (not shown) and printhead carriages 628, allowing printhead carriages 628 to rotate relative to wall member 708.

Sidewall assemblies 636, 638 may each include wall members 728, 730 having leveling rails 732, 734 on upper surfaces 736, 738 thereof. Slider portions 648, 650 of wall member 640 may be slidably engaged with leveling rails 732, 734, generally allowing wall member 640 to travel along the length of leveling rails 732, 734.

In operation, when a printhead carriage 628 is determined to be offset from its target position, it may be adjusted using the features discussed above. Specifically, when a printhead carriage 628 has a pitch misalignment (shown in FIG. 13) it may be corrected using adjustment assembly 642. More specifically, printheads 52 may be adjusted to correct the pitch thereof by rotation of printhead carriages 628 about pivot members 712, 714.

Printhead carriages may be rotated about pivot members 712, 714 through the use of adjustment assembly 642. Slide assembly 664 may be permitted to move along rail 662 by releasing locking mechanism 670. Locking mechanism 670 may be released by loosening clamping bolts 705, 706, 707. Once locking mechanism 670 has been released, first and second motorized actuators 678, 680 may drive slide assembly 664 along the length of rail 662 to a desired position for pitch correction.

As slide assembly 664 travels along rail 662, printhead carriages 628 are rotated about pivot members 712, 714 from a first position (FIG. 30) to a second position (FIG. 31). As printhead carriages 628 are rotated, they become angularly disposed between wall members 640, 708. In order to accommodate the angular displacement of printhead carriages 628, wall member 640 translates along leveling rails 732, 734 as printhead carriages 628 are rotated.

Slider assembly actuation may be accomplished by adjusting a voltage signal to command the motorized actuators to move in or out. Information on the desired location for print head nozzles may be obtained from a vision system, described below.

Figure 33:
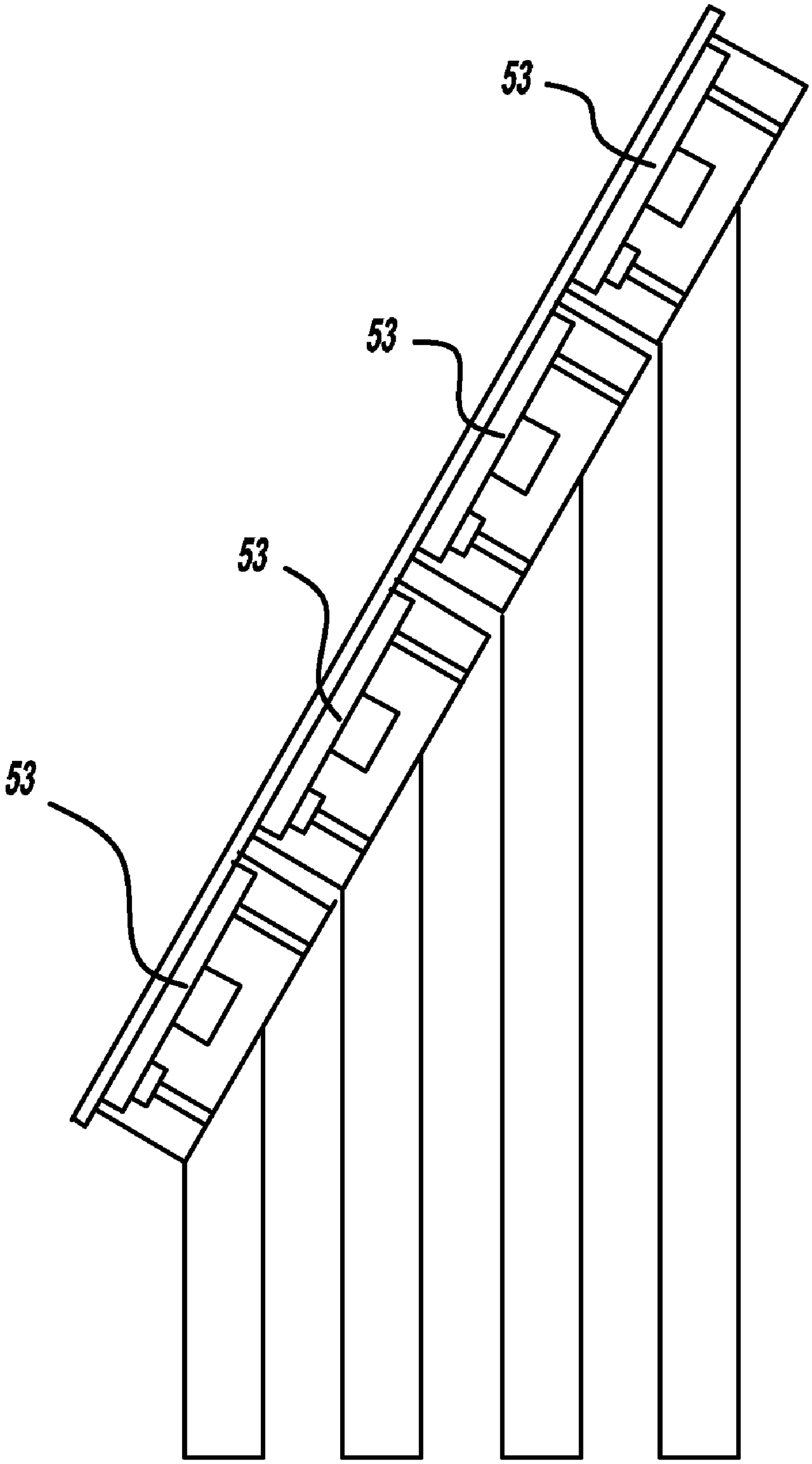
FIG. 33 is a schematic view of a non-contiguous printhead array.

The printhead arrays may be configured as contiguous or non-contiguous arrays. Non-contiguous arrays may include gaps in the print swath between the printheads 52. A schematic representation of a non-contiguous array is demonstrated in FIG. 33. A non-contiguous array may result from physical size limitation imposed by the printhead 52 used requiring gaps to achieve the desired number of jetting arrays in a particular space. The gaps may require a change in the printing method that alters the relative movement of the printhead array to the substrate to ensure all areas of the substrate are printed. The method of pitching may be generally unaffected by this arrangement.

Figure 34:
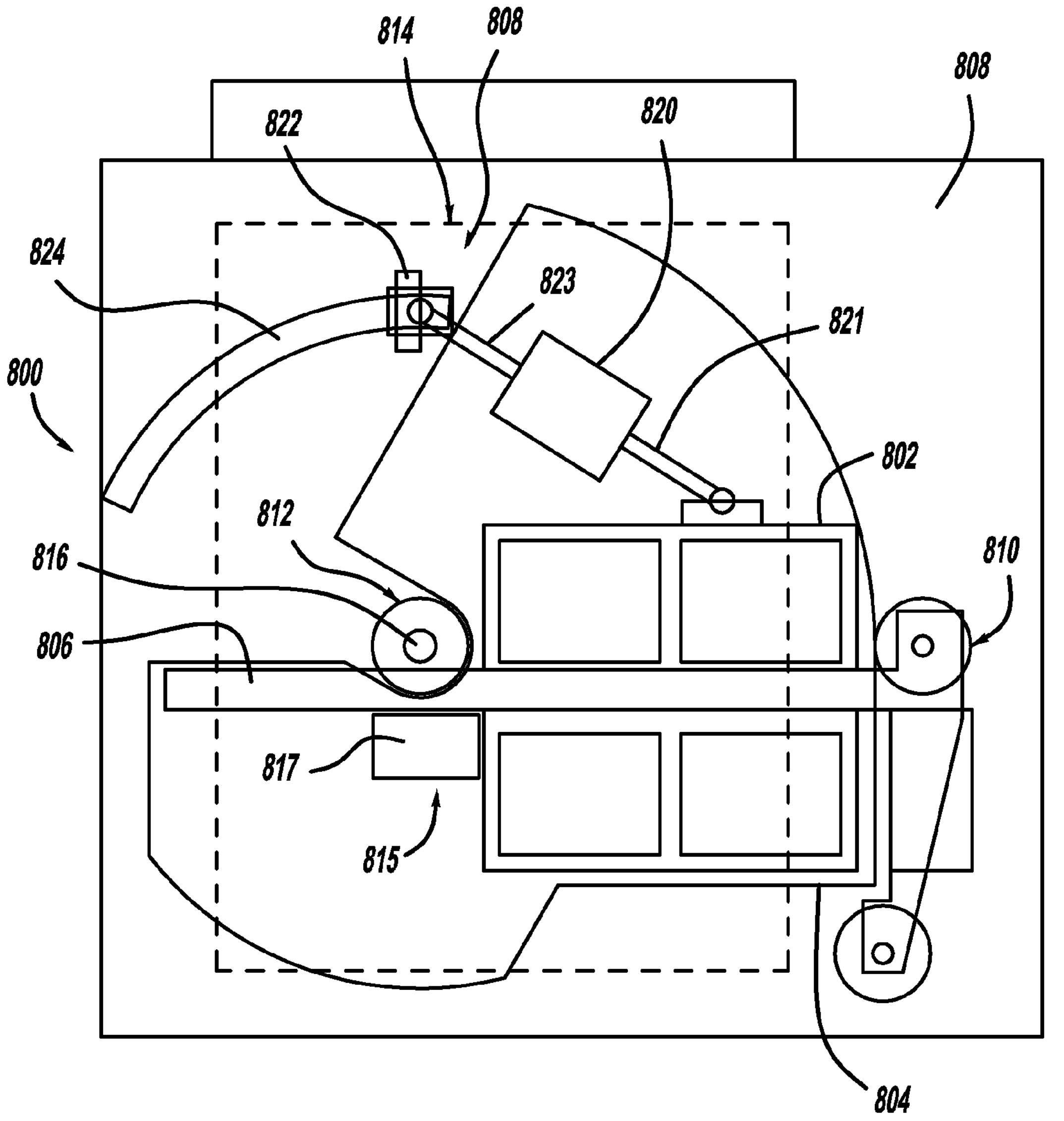
FIG. 34 is a schematic view of an alternative printhead array variable pitch apparatus according to the present disclosure.
Figure 35:
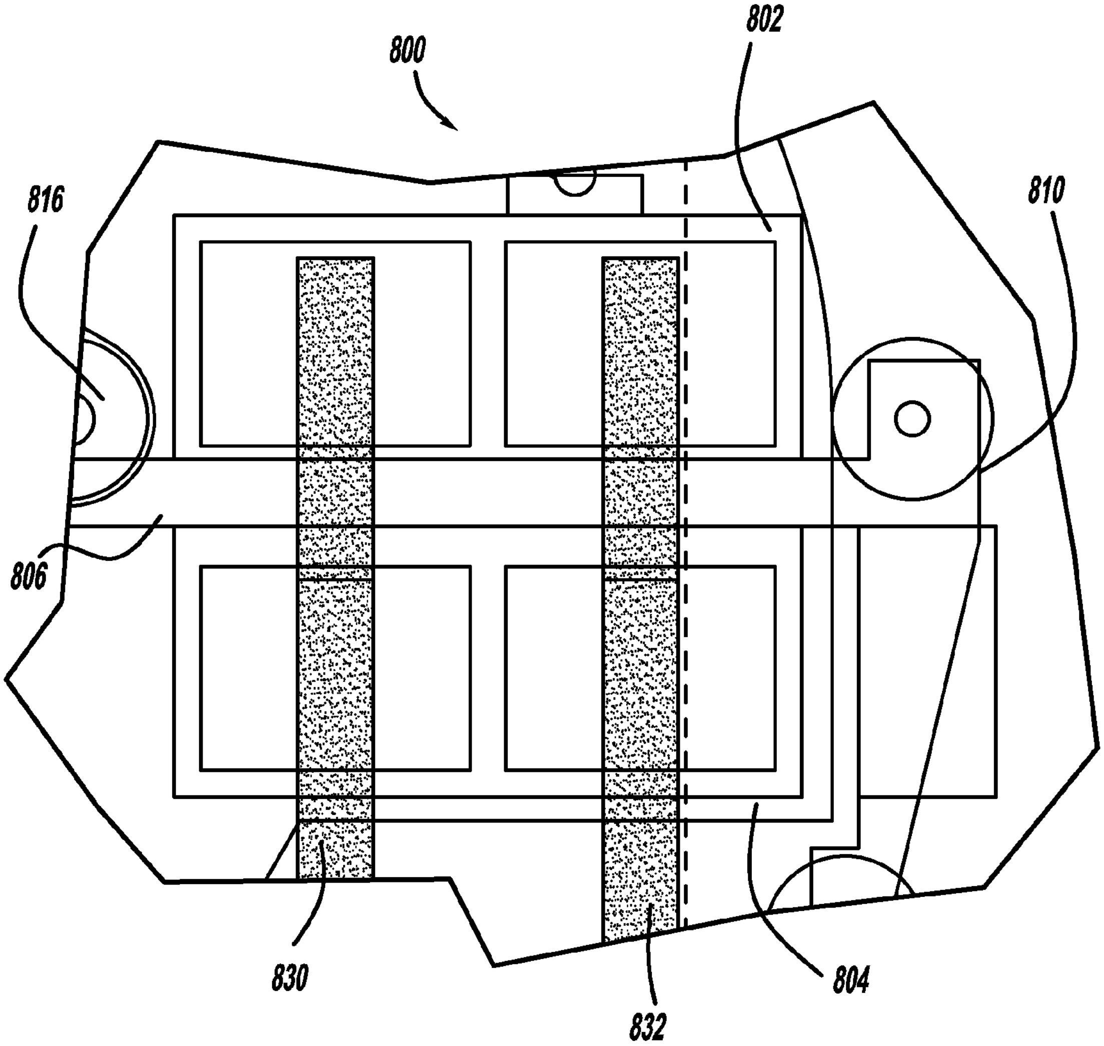
FIG. 35 is a fragmentary schematic view of the printhead array variable pitch apparatus of FIG. 34.
Figure 36:
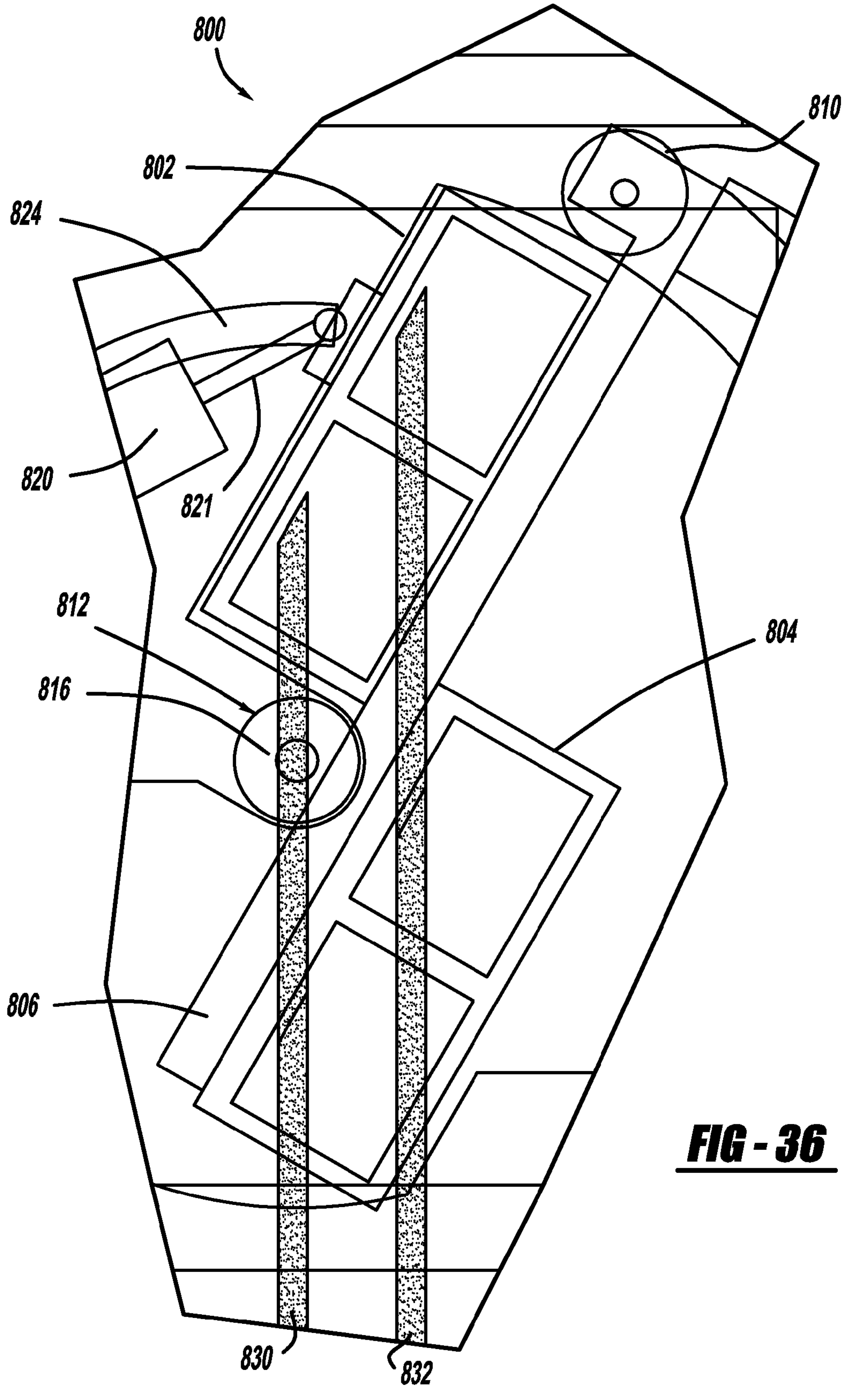
FIG. 36 is an additional fragmentary schematic view of the printhead array variable pitch apparatus of FIG. 34.

An alternative printhead carriage adjustment apparatus 800 is shown schematically in FIGS. 34-36. Printhead carriage adjustment apparatus 800 may include first and second printhead carriages 802, 804, a beam 806, and an actuation assembly 808. First printhead carriage 802 may be fixed to a first side of beam 806 and second printhead carriage 804 may be slidably coupled to a second side of beam 806 generally opposite first printhead carriage 802.

Actuation assembly 808 may include an air bearing assembly 810, a pivot assembly 812, and first and second actuation mechanisms 814, 815. Air bearing assembly 810 may be coupled to a first end of beam 806 near a first end of first printhead carriage 802. Pivot assembly 812 may include a hephaist bearing 816 coupled to a floor 818 of printhead carriage adjustment apparatus 800 and beam 806 near a second end of first printhead assembly 802, providing a rotational coupling therebetween.

First actuation mechanism 814 may include a linear actuator 820 and a movable link 822 slidably coupled to guide groove 824 in printhead array variable pitch apparatus floor 818. Linear actuator 820 may include a first arm 821 coupled to first printhead carriage 802 and may include a second arm 823 coupled to movable link 822. Link 822 may either be manually moved around groove 824 or motorized through various methods to achieve coarse rotation adjustment of beam 806. First arm 821 may be extended or retracted to achieve a fine adjustment of beam 806.

Second actuation mechanism 815 may include a linear actuator 817. Linear actuator 817 may be engaged with second printhead carriage 804 and beam 806. Linear actuator 817 may generally provide for slidable actuation of second printhead carriage 804 along beam 806.

In operation, pitch of first and second printheads 802, 804 may be adjusted by actuation assembly 808. More specifically, as movable link 822 travels along guide groove 824, arms 821, 823 may act on first printhead carriage 802, causing rotation of first and second printhead carriages 802, 804 and beam 806. Linear actuator 820 may further refine rotation of beam 806 through extension or retraction of arm 821. As beam 806 rotates, second printhead carriage 804 may be driven by a linear actuator 817 to achieve proper phasing of second printhead carriage 804 relative to first printhead carriage 802. This process may be automated through use of the vision system, discussed below, to record the relationship of first printhead carriage 802 and second printhead carriage 804 and to initiate movement of second printhead carriage 804 through linear actuator 817.

As generally discussed above, after motion of link 822 is complete, the coarse pitching adjustment of the printhead arrays may be complete. At this point linear actuator 820 may be used in combination with the vision system to rotate beam 806 to the final precise angle of adjustment that achieves pitch accuracies for the printheads within 0.5 microns. Once the appropriate pitch has been obtained the printhead carriage adjustment apparatus 800 may be fixed for printing.

Referring to FIGS. 35 and 36, it should be noted that printhead carriages 802, 804 may be aligned to be generally in phase with one another. More specifically, printheads (not shown) in each of printhead carriages 802, 804 may be aligned such that they print over the same area, resulting in a greater print deposition concentration, as indicated schematically by print deposition areas 830, 832.

Figure 37:
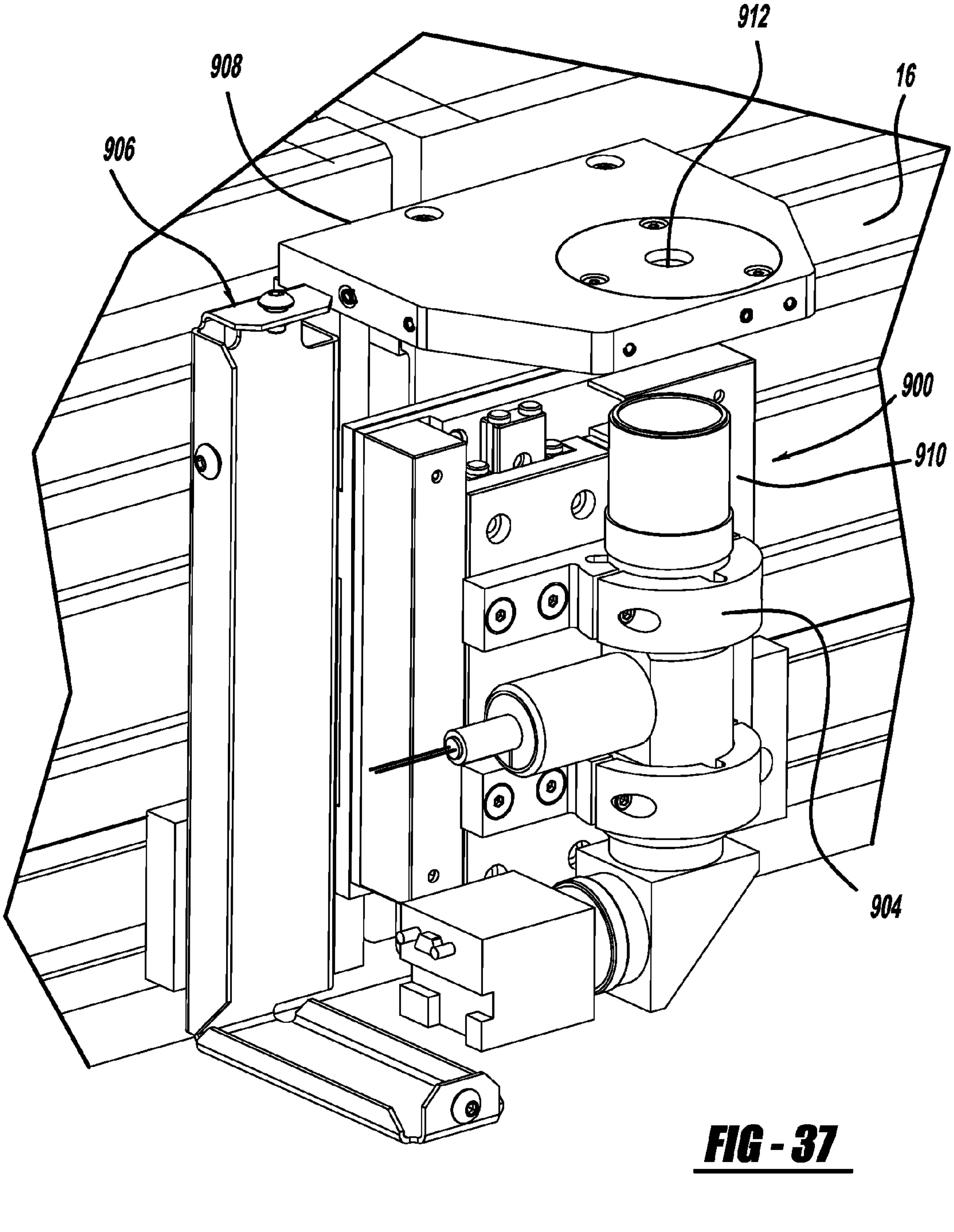
FIG. 37 is a perspective view of the calibration camera assembly shown in FIG. 1.
Figure 38:
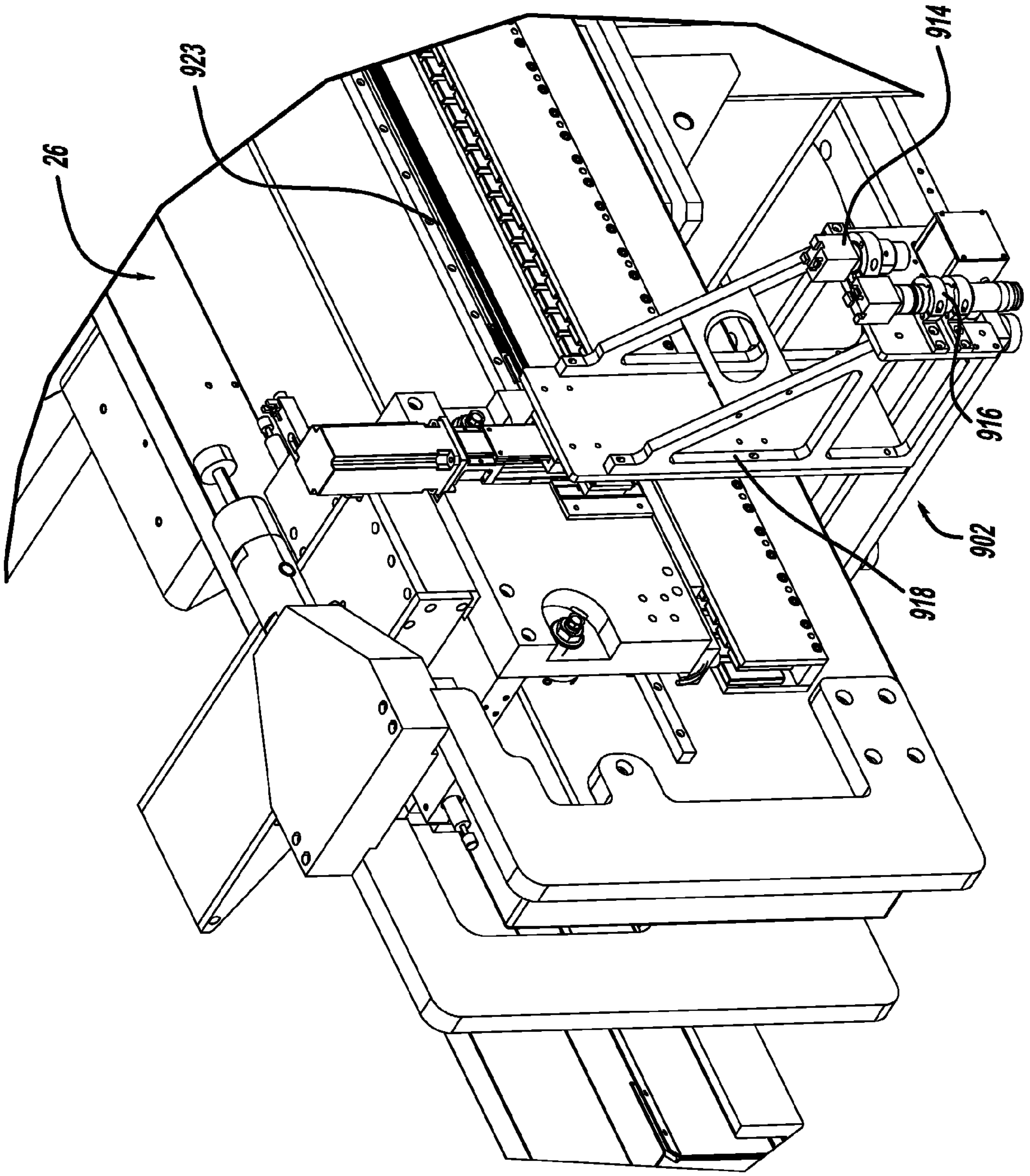
FIG. 38 is a perspective view of the machine vision camera assembly shown in FIG. 1.

Referring back to FIG. 1, vision system 17 of PMD apparatus 10 may include a calibration camera assembly 900 and a machine vision camera assembly 902. With additional reference to FIG. 37, calibration camera assembly 900 may include a calibration camera 904 and a mounting structure 906. Mounting structure 906 may include first and second portions 908, 910.

First portion 908 may be fixed to vacuum chuck 16 and second portion 910 may be slidably coupled to first portion 908. Mounting structure 906 may further include a motor (not shown) for driving second portion 910 relative to first portion 908. Mounting structure 906 may also include a fiducial mark 912 for coordination of calibration camera assembly 900 and machine vision camera assembly 902, discussed below. Calibration camera 904 may be fixed to second portion 910, and may therefore be displaceable relative to vacuum chuck 16 in a direction generally perpendicular to an upper surface of vacuum chuck 16.

The machine vision camera assembly 902 may include a low resolution camera 914, a high resolution camera 916, and a mounting structure 918. Low resolution camera 914 may have a greater field of view than high resolution camera 916. More specifically, low resolution camera 914 may have a field of view of approximately 10 mm by 10 mm. This range may be generally sufficient to accommodate loading errors of substrate 18. Mounting structure 918 may include a bracket 920 and first and second motors (not shown) for movably mounting bracket 920 to second rail 26. The first motor may provide for axial translation along second rail 26 and the second motor may provide for vertical translation of mounting bracket 920 relative to second rail 26. Calibration camera 904, low resolution camera 914, and high resolution camera 916 may all be in communication with a computer 922 on PMD apparatus 10 (FIG. 1).

In operation, calibration camera 904 may be used to determine printhead positioning. Calibration camera 904 may be focused on any of printheads 52 (FIG. 4) in an array to determine relative position between printheads 52. Calibration camera 904 may generate images that are sent to computer 922 for determination of position errors between printheads 52. If an error is found, printheads 52 may be adjusted as described above. Calibration camera 904 may provide positional feedback during correction of printhead position.

As noted above, calibration camera assembly 900 may also include fiducial mark 912. Fiducial mark 912 may be viewed by machine vision camera assembly 902 to coordinate calibration camera assembly 900 and machine vision camera assembly 902. Once relative positioning between calibration camera assembly 900 and machine vision camera assembly 902 is known, relative positioning between printheads 52, calibration camera assembly 900, and machine vision camera assembly 902 may be determined by computer 922 and may be used for printhead 52 and printhead carriage adjustment, as discussed above. Further, relative positioning between vision camera assembly 902 and printhead carriage frame 14 may be known through the use of common optical strip 923. This may generally allow computer 922 to determine relative positioning between substrate 18 and printheads 52 and determine any positioning error therebetween, discussed below.

As noted above, machine vision camera assembly 902 may determine positioning errors between substrate 18 and a printhead carriage. More specifically, low resolution camera 914 may take an initial image of substrate 18 to determine the location of a fiducial mark 924 thereon. Fiducial mark 924 may be small, e.g., approximately 1 $mm^2$, and may be in the form of an etched chrome marking. Once the general location of a fiducial mark 924 has been determined, machine vision camera assembly 902 and substrate 18 may be translated so that high resolution camera 916 can provide a detailed image to computer 922 to determine substrate 18 orientation through the use of a machine vision algorithm. While indicated as an "X" in FIG. 1, fiducial mark 924 may include a variety of forms. The image of fiducial mark 924 may be analyzed to determine rotational orientation of substrate 18, as well as the position of substrate 18 along the substrate axis. An additional fiducial mark 926 may be located on substrate 18 to assist with the rotational orientation determination. Fiducial marks 924, 926 may generally be located in opposite corners from one another. High resolution camera 916 may be used to locate fiducial mark 926 without the assistance of low resolution camera 914 based on the orientation of fiducial mark 924.

Once the rotational orientation of substrate 18 is determined, the printhead carriages disclosed above may have their respective orientations adjusted to account for the positioning error in any of the variety of ways discussed above. Additionally, the machine vision camera assembly 902 may periodically provide images of fiducial marks 924, 926 to computer 922 to determine positional errors throughout operation of PMD apparatus 10. For example, fiducial marks may be analyzed to determine any thermal growth of substrate 18. This may be determined by variation in size of and/or distance between fiducial marks 924, 926.

The use of the various camera systems and adjustment mechanisms may be automated into a servo-loop control system by computer 922. This may eliminate possible sources of human error. It also may allow for alignment adjustments to be made "on the fly" to automatically adjust for variations in printhead position caused by thermal expansion or contraction, or for thermal expansion of the printing material that has been loaded onto the system.

What is claimed is:

1. A printing apparatus comprising:

a chuck configured to support a substrate thereon;

a rail spaced apart from the chuck;

a printhead carriage frame coupled to the rail and containing a printhead carriage housing at least one printhead therein;

a first camera assembly coupled to the chuck and configured to capture image data of the printhead and provide the image data to a computer;

a second camera assembly moveably coupled to the rail, wherein the second camera assembly is configured to capture an image of the substrate;

a fiducial mark coupled to the chuck that is viewable by both the first and second camera assemblies; and a computer receiving the image data from the first camera assembly and configured to determine a deviation between a desired position of the printhead and an actual position of the printhead, wherein the computer is configured to control at least one of firing of the printhead and relative movement between the chuck and the printhead carriage frame based upon the deviation, and wherein a camera of the first camera assembly is configured to be movable in a direction generally perpendicular to an upper surface of the chuck, wherein the computer is configured to:

determine relative positioning between the first camera assembly and the second camera assembly based on (i) imaging by the first camera assembly of the fiducial mark and (ii) imaging by the second camera assembly of the fiducial mark;

determine relative positioning between the printhead and the first camera assembly based on the image data of the printhead;

determine relative positioning between the substrate and the second camera assembly based on the image of the substrate; and determine relative positioning between the printhead and the substrate based on (i) the determined relative positioning between the printhead and the first camera assembly, (ii) the determined relative positioning between the substrate and the second camera assembly, and (iii) the determined relative positioning between the first camera assembly and the second camera assembly.

2. The printing apparatus of claim 1 wherein the first camera assembly is generally pointed toward the printhead.

3. The printing apparatus of claim 1 wherein the printhead carriage includes at least two printheads, the first camera assembly configured to capture image data of the at least two printheads and provide the image data to the computer, the computer configured to determine a deviation between an actual position of the at least two printheads relative to one another and a desired position of the at least two printheads relative to one another.

4. The printing apparatus of claim 1 wherein the computer determines an orientation of the substrate based on the image of the substrate.

5. The printing apparatus of claim 1 wherein the computer is configured to automatically adjust a positioning between the printhead and the substrate based on an input from at least one of the first and second camera assemblies.

6. The printing apparatus of claim 5 wherein the printhead carriage houses a plurality of printheads, and wherein the automatic adjustment includes an individual adjustment of at least one of the plurality of printheads.

7. The printing apparatus of claim 5 wherein the printhead carriage is rotatably coupled to the printhead carriage frame, and wherein the automatic adjustment includes rotation of the printhead carriage relative to the substrate.

8. A printing apparatus comprising:

a chuck configured to support a substrate thereon;

a rail spaced apart from the chuck;

a printhead carriage frame coupled to the rail and containing a printhead therein;

a first camera assembly configured to capture image data of the printhead, wherein a camera of the first camera assembly is configured to be moveable in a direction generally perpendicular to an upper surface of the chuck;

a second camera assembly configured to capture image data of the substrate; and a computer in communication with the first and second camera assemblies, wherein one of the first and second camera assemblies includes a fiducial mark viewable by both the first and second camera assemblies, and wherein the computer is configured to:

determine relative positioning between the first camera assembly and the second camera assembly based on (i) imaging by the first camera assembly of the fiducial mark and (ii) imaging by the second camera assembly of the fiducial mark;

determine relative positioning between the printhead and the first camera assembly based on the image data of the printhead;

determine relative positioning between the substrate and the second camera assembly based on the image data of the substrate; and determine relative positioning between the printhead and the substrate based on (i) the determined relative positioning between the printhead and the first camera assembly, (ii) the determined relative positioning between the substrate and the second camera assembly, and (iii) the determined relative positioning between the first camera assembly and the second camera assembly.

9. The printing apparatus of claim 8 wherein the computer is configured to determine a deviation between a desired position of the printhead and an actual position of the printhead.

10. The printing apparatus of claim 8 wherein the printhead carriage frame houses at least two printheads therein, the first camera assembly configured to capture image data of the at least two printheads, the computer configured to determine a deviation between a desired position of the printheads relative to one another and an actual position of the printheads relative to one another.

11. The printing apparatus of claim 8 wherein the computer is configured to determine relative positioning between the printhead carriage frame and the substrate.

12. The printing apparatus of claim 8 wherein the second camera assembly is moveably coupled to the rail.

13. The printing apparatus of claim 8 wherein the first camera assembly includes a first camera and a second camera, wherein a resolution of the first camera is lower than a resolution of the second camera, and wherein both the first camera and the second camera selectively capture image data of a substrate fiducial mark located on the substrate.

* * * * *